(12) United States Patent
Lee et al.

(10) Patent No.: US 12,311,493 B2
(45) Date of Patent: May 27, 2025

(54) AUTOMATIC PROCESSING APPARATUS

(71) Applicant: Agile Wing Smart Manufacturing Co., Ltd., Taichung (TW)

(72) Inventors: Hung-Wu Lee, Taichung (TW); Yong-Lin Chen, Taichung (TW); Ching-San Wang, Taichung (TW); Wan-Ting Hong, Taichung (TW); Chuan-Chiang Chang, Taichung (TW); Chi-Liang Liu, Taichung (TW)

(73) Assignee: Agile Wing Smart Manufacturing Co., Ltd., Taichung (TW)

( * ) Notice: Subject to any disclaimer, the term of this patent is extended or adjusted under 35 U.S.C. 154(b) by 811 days.

(21) Appl. No.: 17/395,615

(22) Filed: Aug. 6, 2021

(65) Prior Publication Data
US 2022/0168860 A1 Jun. 2, 2022

(30) Foreign Application Priority Data

Nov. 30, 2020 (TW) ................................. 109141998
Nov. 30, 2020 (TW) ................................. 109142001
Dec. 11, 2020 (TW) ................................. 109216434

(51) Int. Cl.
| | |
|---|---|
| *B24B 31/02* | (2006.01) |
| *B24B 31/033* | (2006.01) |
| *B24B 41/00* | (2006.01) |
| *B25J 9/00* | (2006.01) |
| *B25J 11/00* | (2006.01) |

(52) U.S. Cl.
CPC ............ *B24B 31/02* (2013.01); *B24B 31/033* (2013.01); *B24B 41/005* (2013.01); *B25J 9/0084* (2013.01); *B25J 9/0096* (2013.01); *B25J 11/0065* (2013.01)

(58) Field of Classification Search
CPC ........... B24B 31/00–003; B24B 31/02; B24B 31/033; B24B 41/005; B24B 41/06; B25J 9/0084; B25J 9/0093; B25J 9/0096; B25J 11/005; B25J 11/0065; B23Q 7/02; B23Q 7/048
See application file for complete search history.

(56) References Cited

FOREIGN PATENT DOCUMENTS

| | | | |
|---|---|---|---|
| CN | 108436525 A | * | 8/2018 |
| DE | 2457859 A1 | * | 6/1976 |
| JP | H0644589 Y2 | | 11/1994 |
| JP | 2011212767 A | | 10/2011 |

(Continued)

OTHER PUBLICATIONS

Translation of DE2457859 (Year: 1976).*
CN108436525 (Year: 2018).*

*Primary Examiner* — Matthew P Travers
(74) *Attorney, Agent, or Firm* — Best & Flanagan LLP

(57) ABSTRACT

An automatic processing apparatus comprises a main body, a receiving portion, a working assembly, a workpiece magazine, a setting mechanism, a passivation bucket assembly, and a rotation driving assembly. The receiving potion is adapted for receiving a plurality of workpieces. The setting mechanism takes the workpieces to the receiving portion from the workpiece magazine. The working assembly is adapted for bringing the workpieces to the passivation bucket assembly for processing. The passivation bucket assembly includes a turning table and a plurality of passivation buckets moving when the turning table rotates. The rotation driving assembly drives one of the passivation buckets to rotate.

12 Claims, 21 Drawing Sheets

(56) References Cited

FOREIGN PATENT DOCUMENTS

| JP | 2015127073 A | 7/2015 |
|---|---|---|
| KR | 0135080 Y1 | 3/1999 |
| TW | I632980 B | 8/2018 |

\* cited by examiner

AUTOMATIC PROCESSING APPARATUS

FIELD OF THE INVENTION

The present disclosure relates to an automatic processing apparatus.

BACKGROUND OF THE INVENTION

Milling cutters or drilling bits have to be processed by passivation when manufacturing. Passivation is also necessary in the manufacturing process of other tools. Generally, the workpiece is grasped by a taking member and is inserted into a container filled with passivation particles. When the container or the taking member moves or rotates, the workpiece is grinded or polished by the particles.

Different workpieces have to be processed by particles in different sizes or kinds. In practice, plural buckets filled with particles in different sizes are prepared in advance, and the bucket is replaced by other buckets from the rotation mechanism. However, the replacement of buckets has to be made by manual operation to become time-consuming and laborious. Thus, automatic passivation process is hard to achieved.

Besides, the conventional taking member can pick up only one workpiece. Even if plural taking members are arranged, the taking members have to pick up the workpieces one by one. In addition, the size of the workpiece has to be checked before processing because different particles may be used. However, it is time-consuming to measure the size of the workpiece. On the other hand, the workpiece may fall when the workpiece is not positioned well.

In addition, the workpieces are usually transported from the workpiece magazine to the processing machine by manipulators, as shown in patent TW 1632980.

The supporting portion of the workpiece magazine mentioned above carries the tray to move away from the workpiece magazine by the magnetic portion. Thus, both the tray and the supporting portion have to be disposed with corresponding magnetic portions so as to increase the cost. In addition, the structure, the characteristics, and the applicable environment of the tray are restricted. Besides, the tray may be shaking when sliding from the magazine to the supporting portion, so it is disadvantageous to process automatically.

Besides, passivation particles may adhere onto the workpiece during processing. It is time-consuming and laborious to remove the particles on each workpiece manually. If the plural workpieces are placed on the tray and are cleaned directly, the particles may not be removed thoroughly, and the workpieces may be slightly moved to make the positions of the workpieces inconstant.

In addition, if the workpiece is clamped by the manipulator to insert to the passivation bucket, only part of the passivation particles may be pushed by the workpiece. For example, the passivation particles near the bottom of the passivation bucket are almost fixed. Thus, those particles may agglomerate and solidate. On the contrary, the particles pushed by the workpieces often are abraded quickly. Therefore, the particles become inconstant to male the performance of passivation unstable.

The present invention is, therefore, arisen to obviate or at least mitigate the above mentioned disadvantages.

SUMMARY OF THE INVENTION

One of the objects of the present invention is to provide an automatic processing apparatus which is able to improve the efficiency of automatic processing.

To achieve the above and other objects, the present invention provides an automatic processing apparatus including a main body, a receiving portion, a working assembly, a workpiece magazine, a receiving mechanism, a passivation bucket assembly, and a rotation driving assembly.

The receiving portion is arranged on the main body and includes a plurality of receiving areas spacedly arranged. Each of the receiving areas is adapted for receiving a workpiece. The working assembly is disposed on the main body and includes a turning mechanism and a taking mechanism. The turning mechanism drives the taking mechanism to pivot about a first turning axis between a taking position and a working position. The taking mechanism includes a plurality of taking members spacedly arranged. Relative positions of the taking members depend on relative positions of the receiving areas so that the taking members are located above the receiving areas for taking the workpieces on the receiving areas simultaneously to further take the workpieces to the working position when the taking mechanism is pivoted to the taking position.

The workpiece magazine includes a plurality of tables and a driving apparatus. At lease two of the tables are spacedly arranged along a vertical direction. Each of the tables is adapted for supporting a tray. Each of the trays is adapted for receiving a plurality of workpieces. The driving apparatus includes a moving table, a horizontal driver, and a vertical driver. The moving table is adapted for receiving the trays on the tables and returning the trays to the tables. One of the horizontal driver and the vertical driver is connected to the other one and the moving table therebetween so as to drive the moving table to move horizontally and vertically.

The taking mechanism is disposed on the main body and includes a movable carrying mechanism. The carrying mechanism is adapted for carrying the workpieces on the trays on the moving table to the receiving portion and further placing the workpieces on the receiving areas respectively.

The passivation bucket assembly includes a base, a turning table, and a plurality of passivation buckets. The turning table is rotatably disposed on the base. The passivation buckets are spacedly arranged along the circumferential direction of the turning table on the top of the turning table. Each of the passivation bucket has a first connection structure on a bottom thereof.

The rotation driving assembly is disposed on the base and is located at a side of the turning table remote from the passivation buckets. The rotation driving assembly is rotatable about a rotation axis. The rotation driving assembly is also movable between a driving position and an original position to move toward the turning table or away from the turning table. The rotation driving assembly has a second connection structure corresponding to the first connection structure so that the second connection structure is able to connect to the first connection structure. Thereby, the passivation bucket can be non-rotatably connected to the rotation driving assembly.

When the rotation driving assembly is at the driving position, the first connection structure and the second connection structure are connected together so that the passivation bucket can be driven to rotate about the rotation axis by the rotating rotation driving assembly. When the rotation driving assembly is at the original position, the first connection structure and the second structure are separated from each other so that the passivation bucket is unable to be driven to rotate by the rotating rotation driving assembly.

Therefore, the present invention provides an automatic processing chain from the workpiece magazine to the working assembly. Thus, the efficiency is improved, and the cost is reduced.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

The present disclosure can be more fully understood by reading the following detailed description of the embodiment, with reference made to the accompanying drawings as follows.

DETAILED DESCRIPTION OF THE PREFERRED EMBODIMENTS

Figure 1:
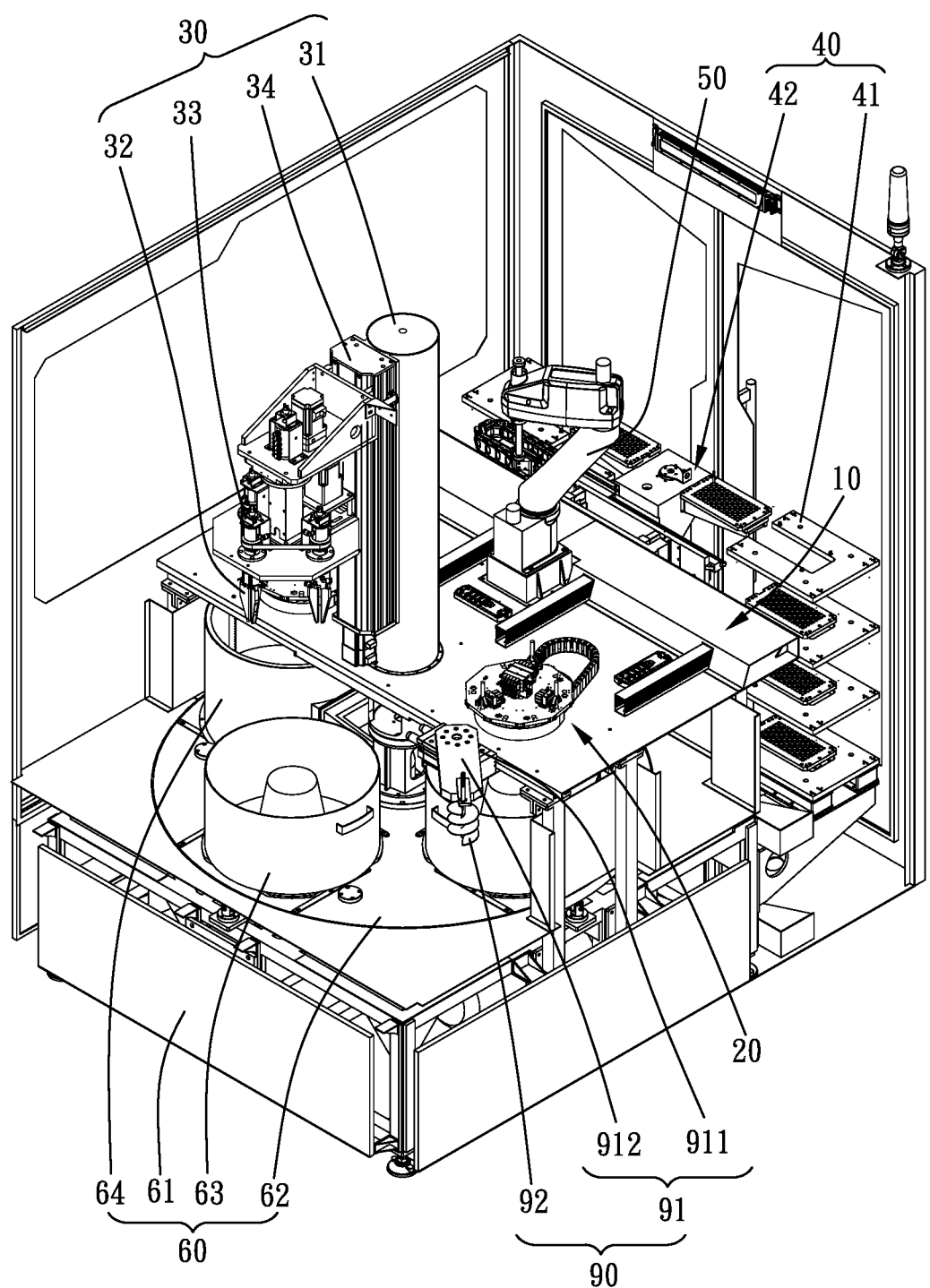
FIG. 1 is a stereogram of the present invention.
Figure 2:
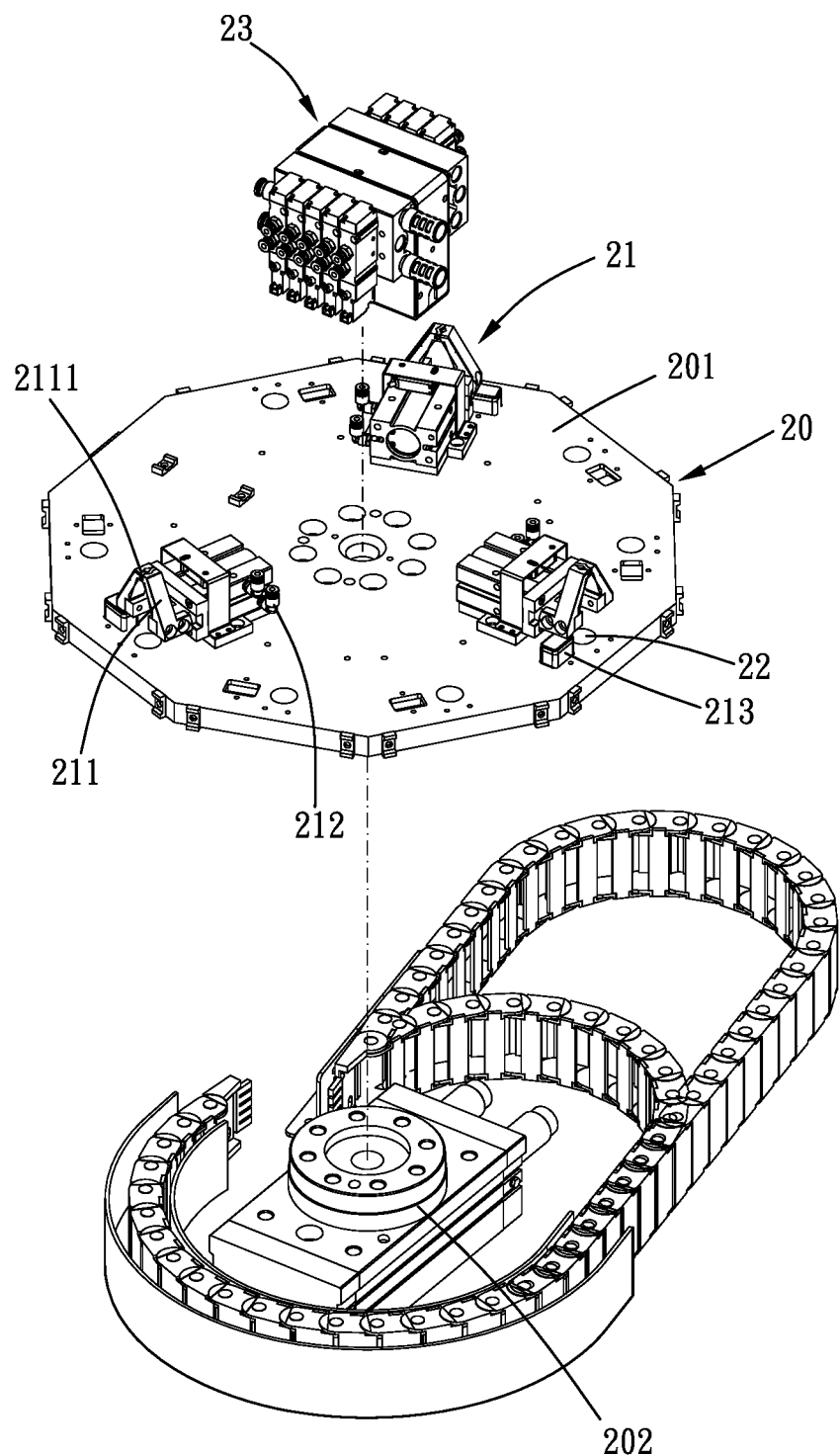
FIG. 2 is a breakdown drawing showing a receiving portion of the present invention.
Figure 3:
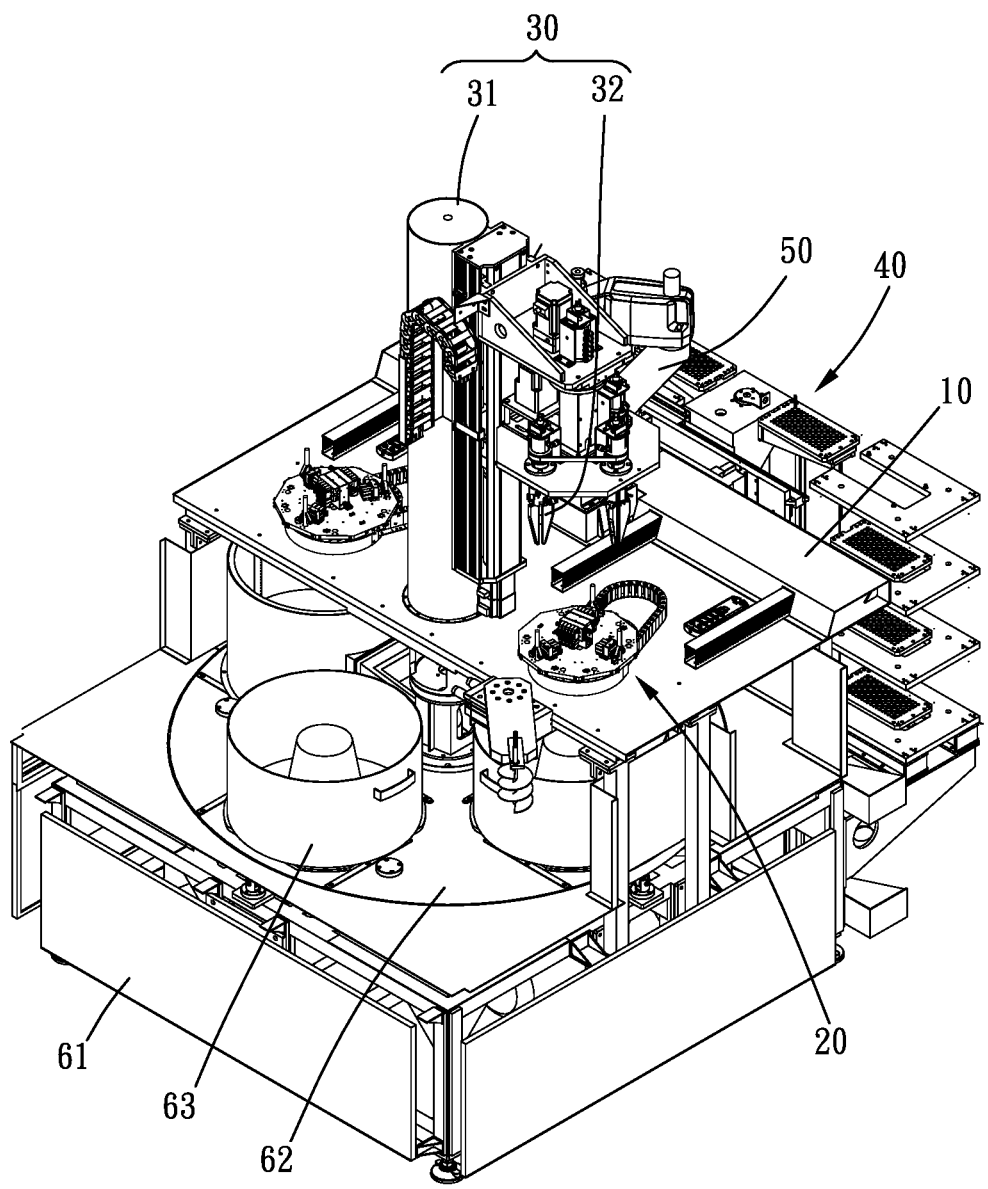
FIG. 3 to FIG. 6 are illustrations showing a working assembly of the present invention.
Figure 4:
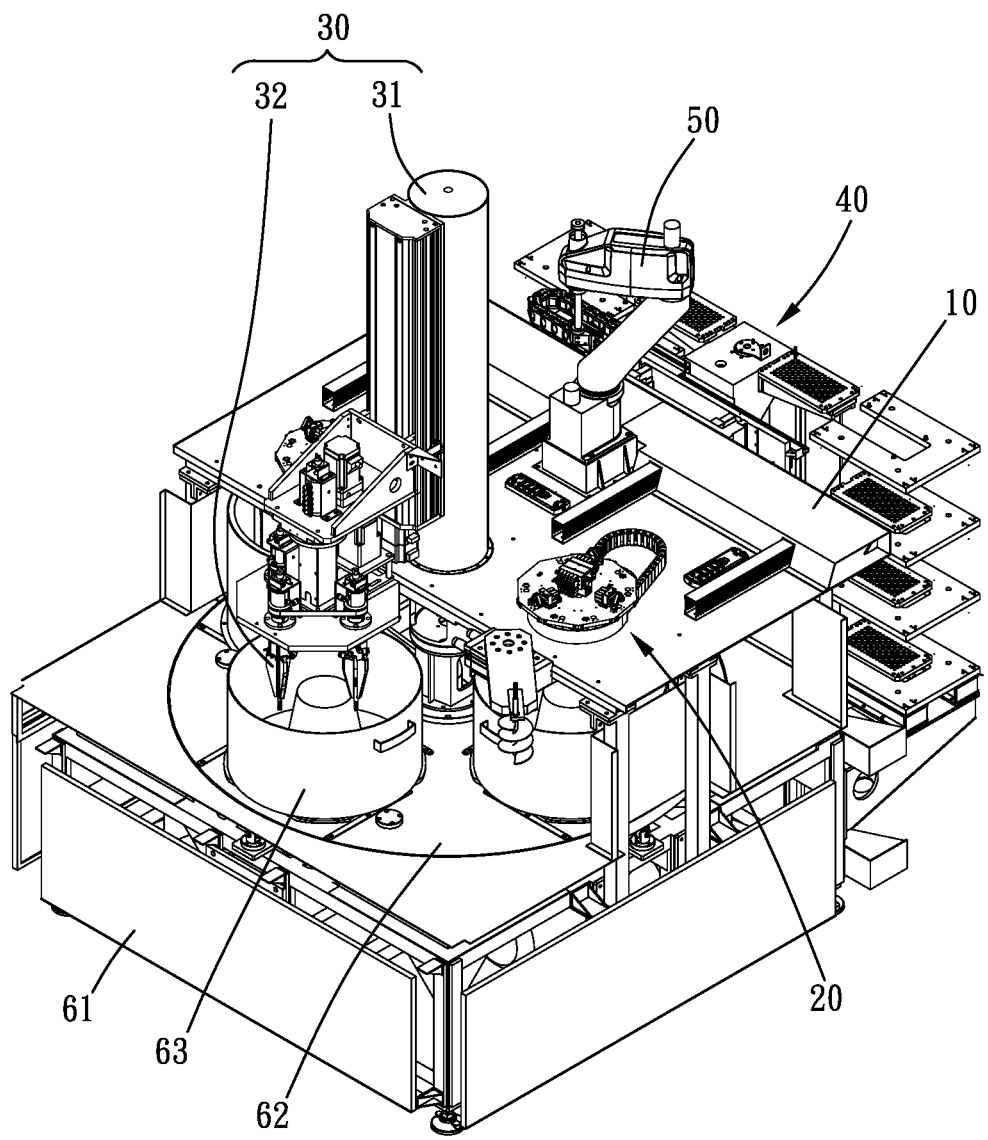
Figure 5:
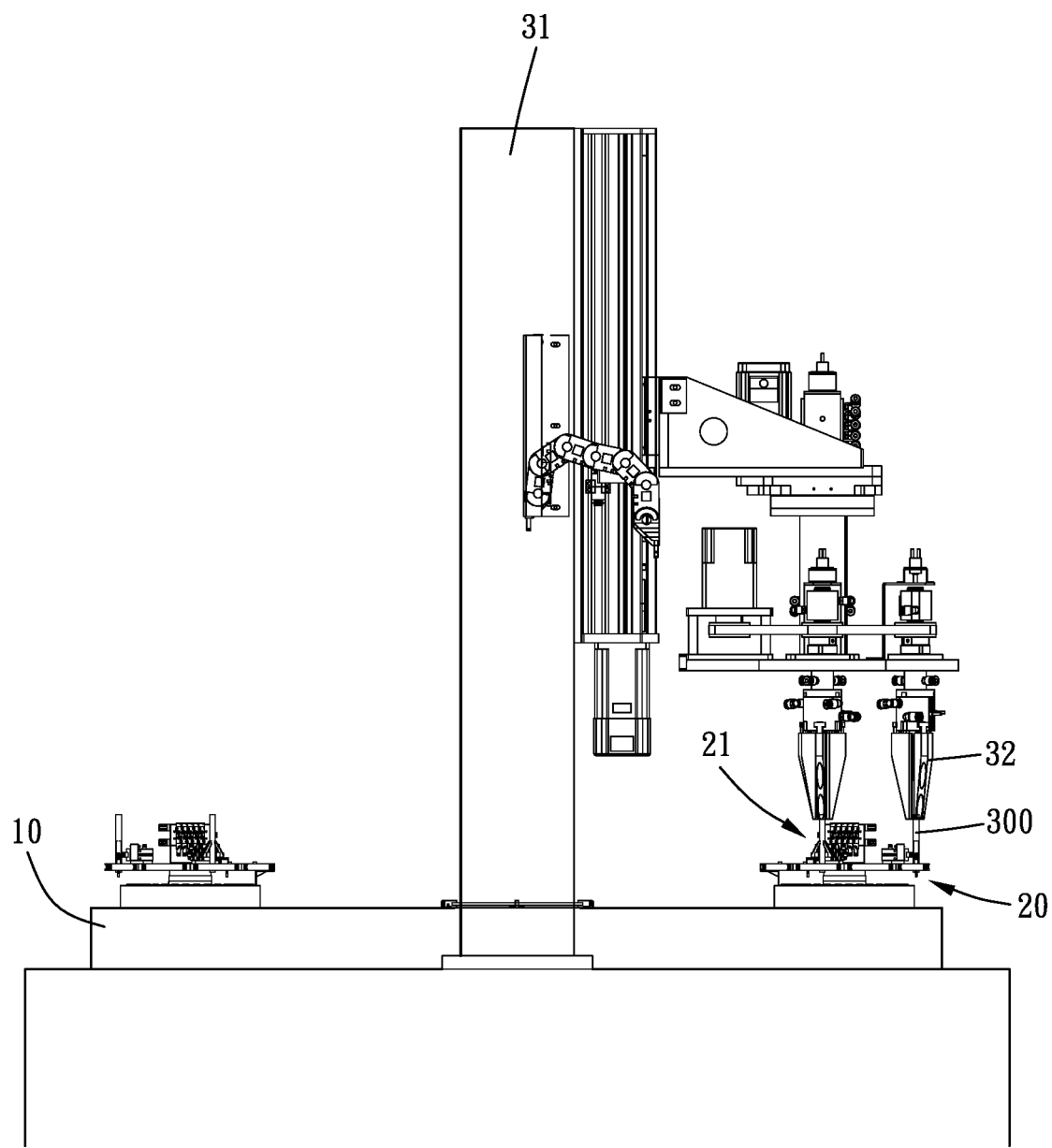
Figure 6:
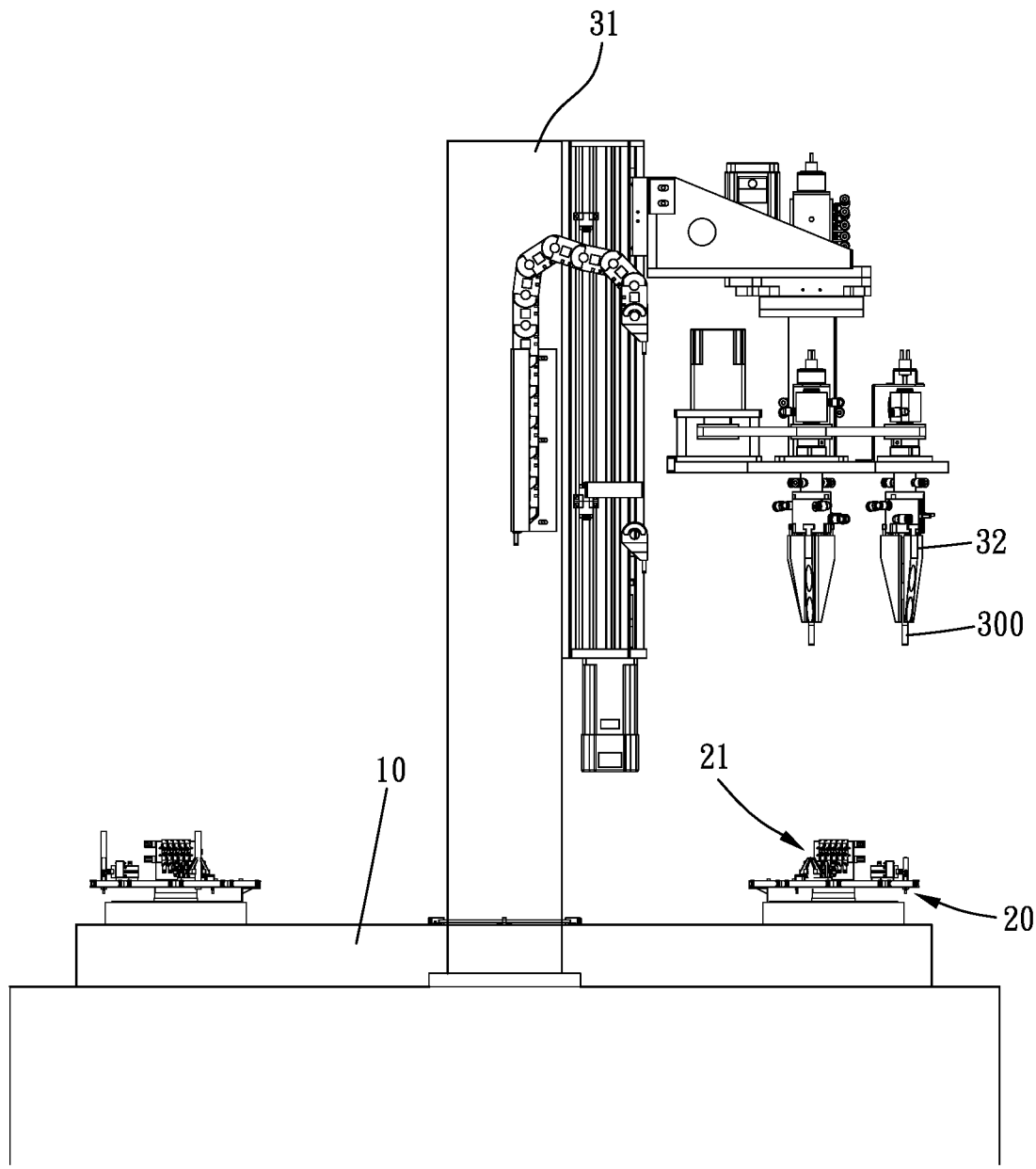
Figure 7:
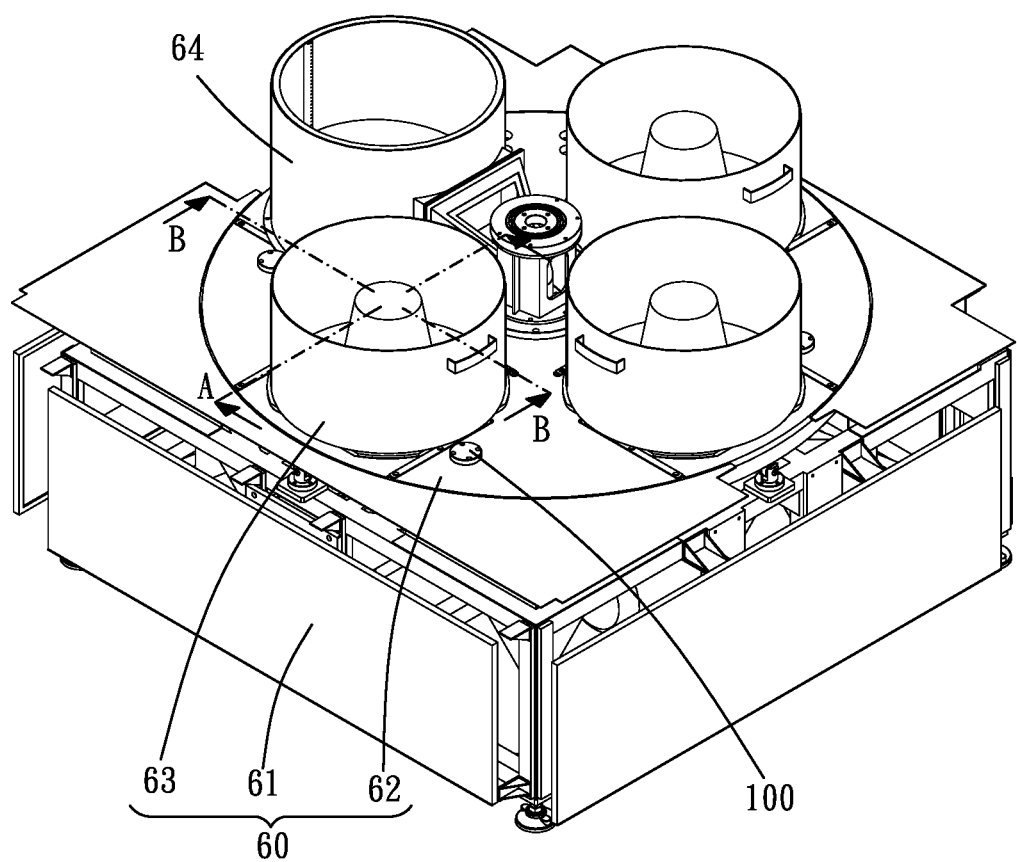
FIG. 7 is a stereogram showing a passivation bucket assembly of the present invention.
Figure 8:
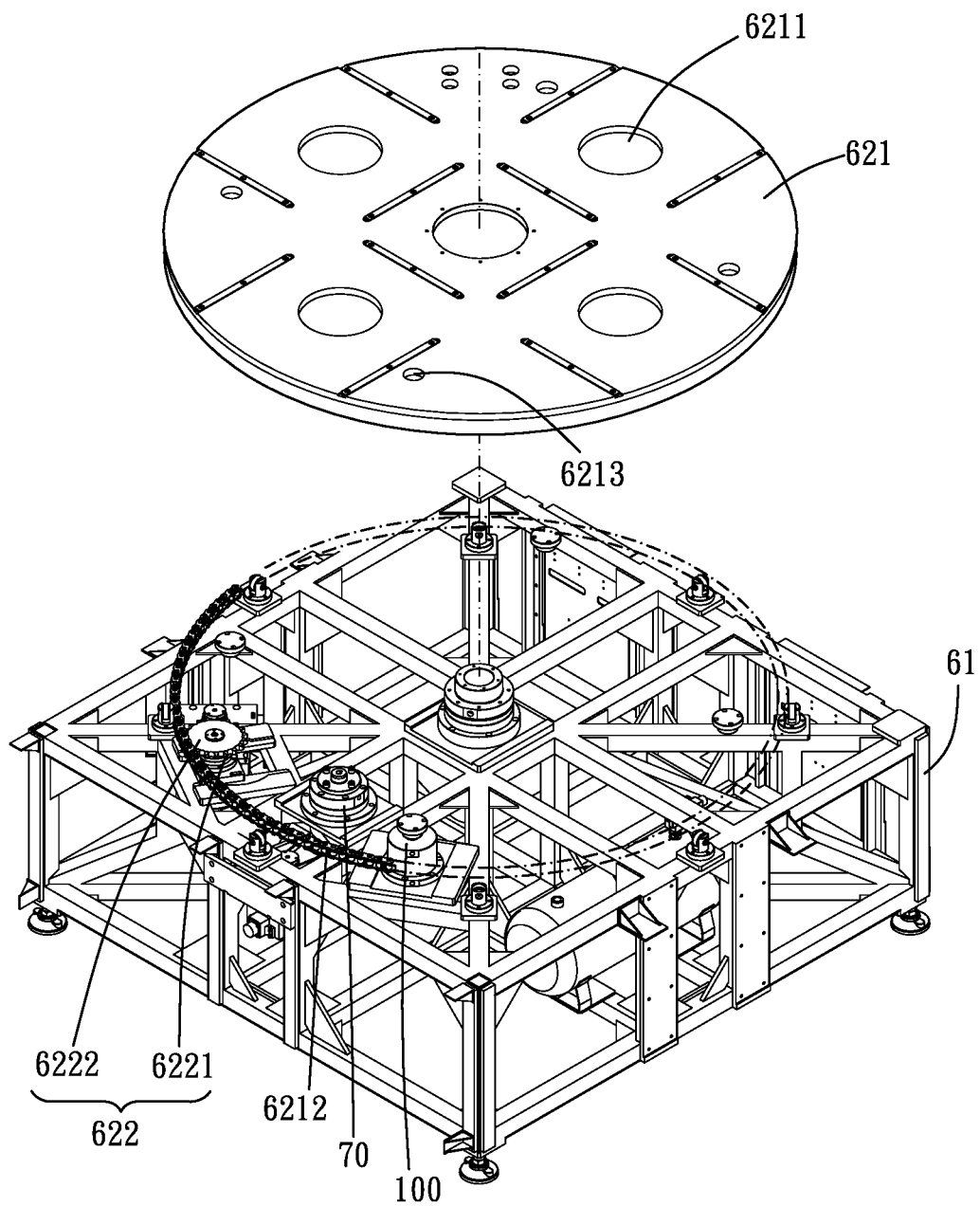
FIG. 8 is a partial breakdown drawing showing a passivation bucket assembly of the present invention.
Figure 9A:
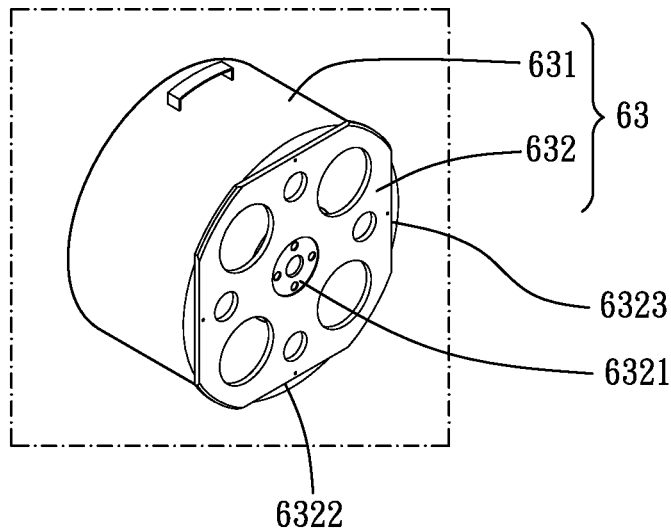
FIG. 9A is an other stereogram showing a passivation bucket of the present invention.
Figure 9:
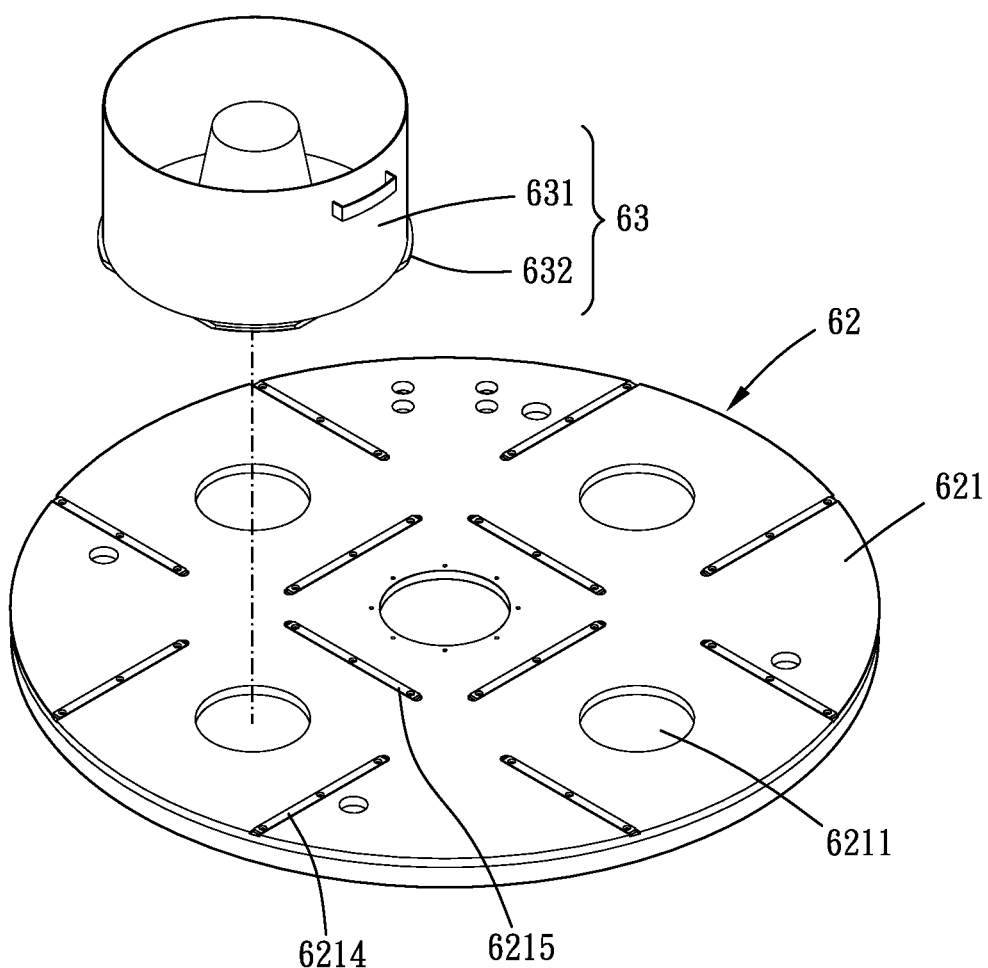
FIG. 9 is a breakdown drawing showing a passivation bucket and a turning table of the present invention.
Figure 10:
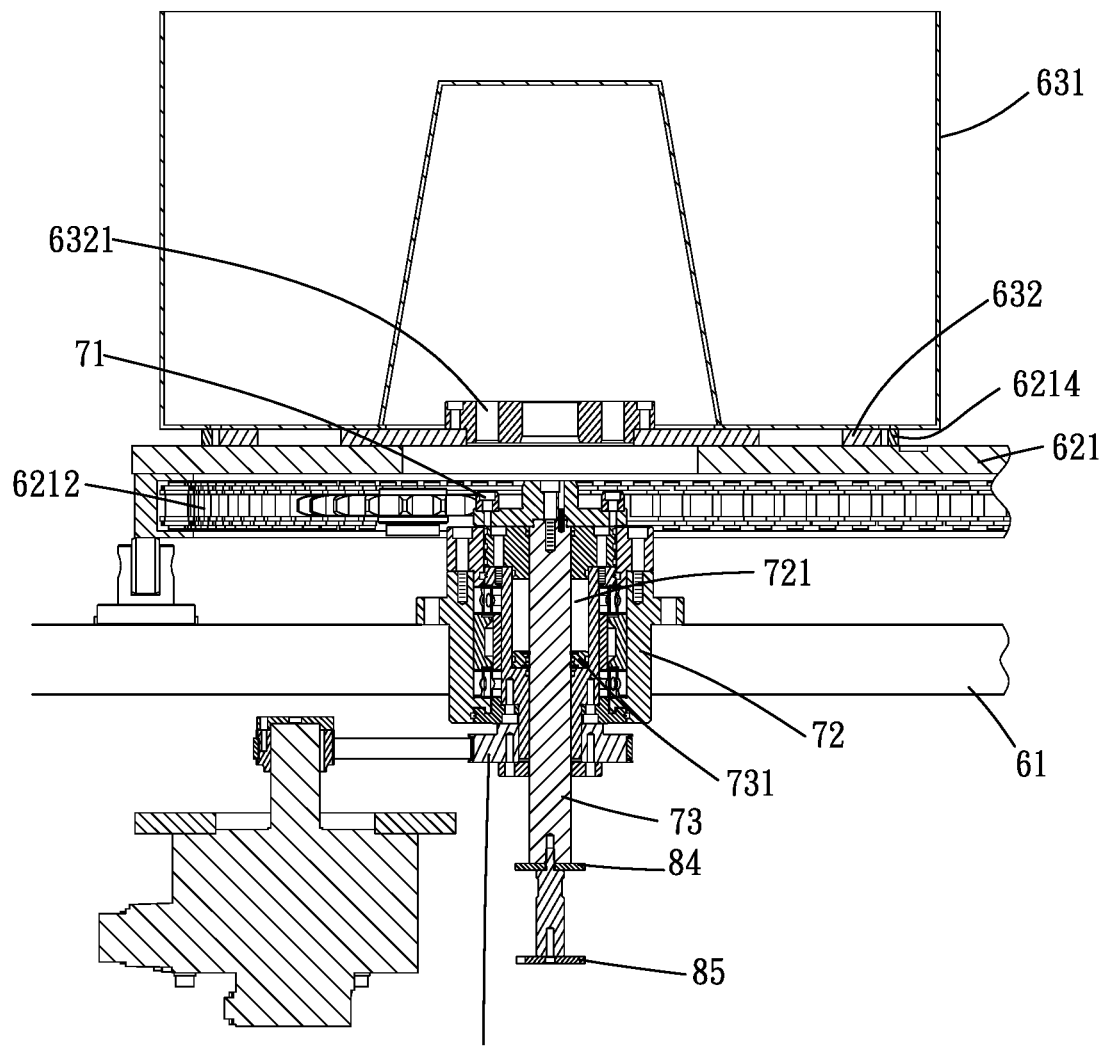
FIG. 10 is a cross-section view showing a passivation bucket assembly and a rotation driving assembly of the present invention.
Figure 11:
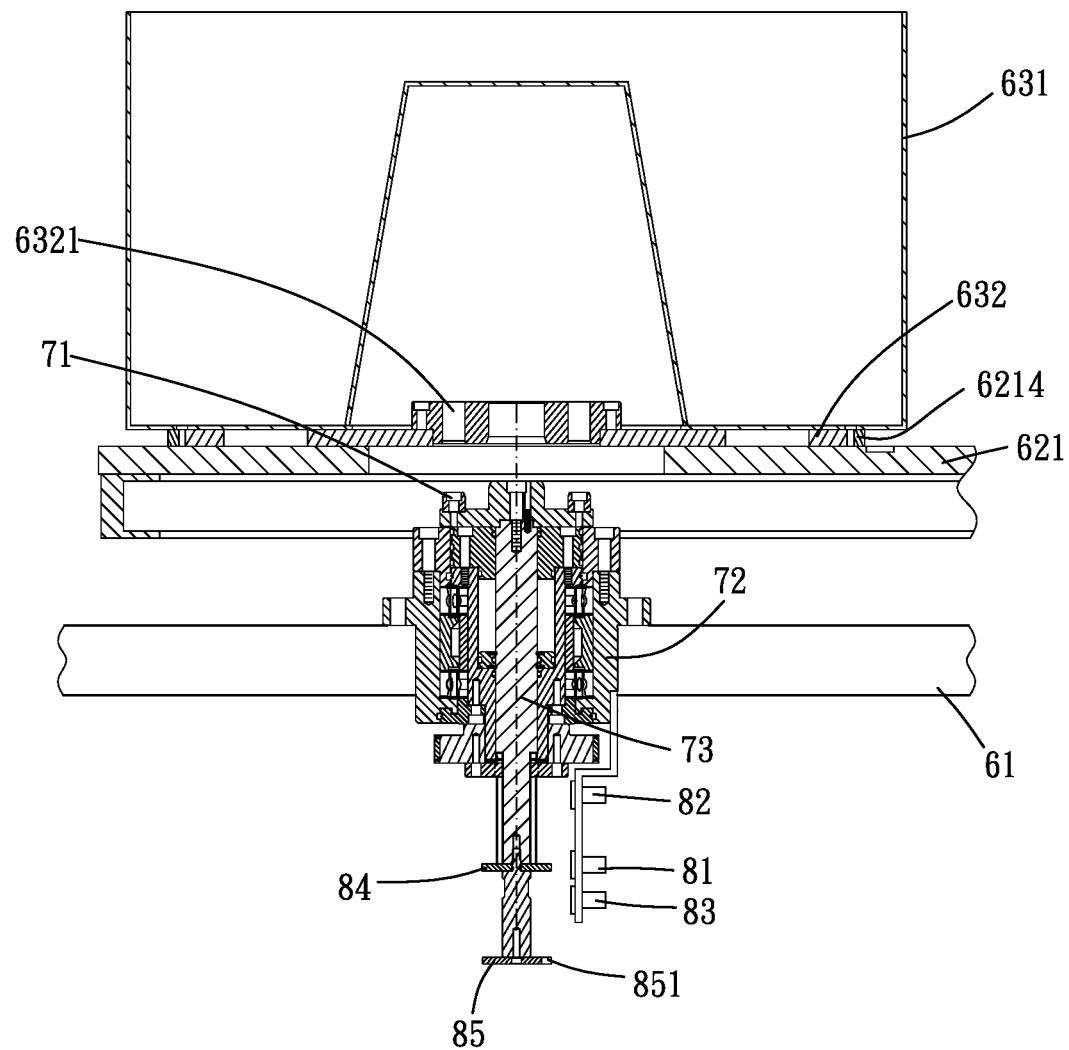
FIG. 11 to FIG. 13 are illustrations showing a rotation driving assembly of the present invention.
Figure 12:
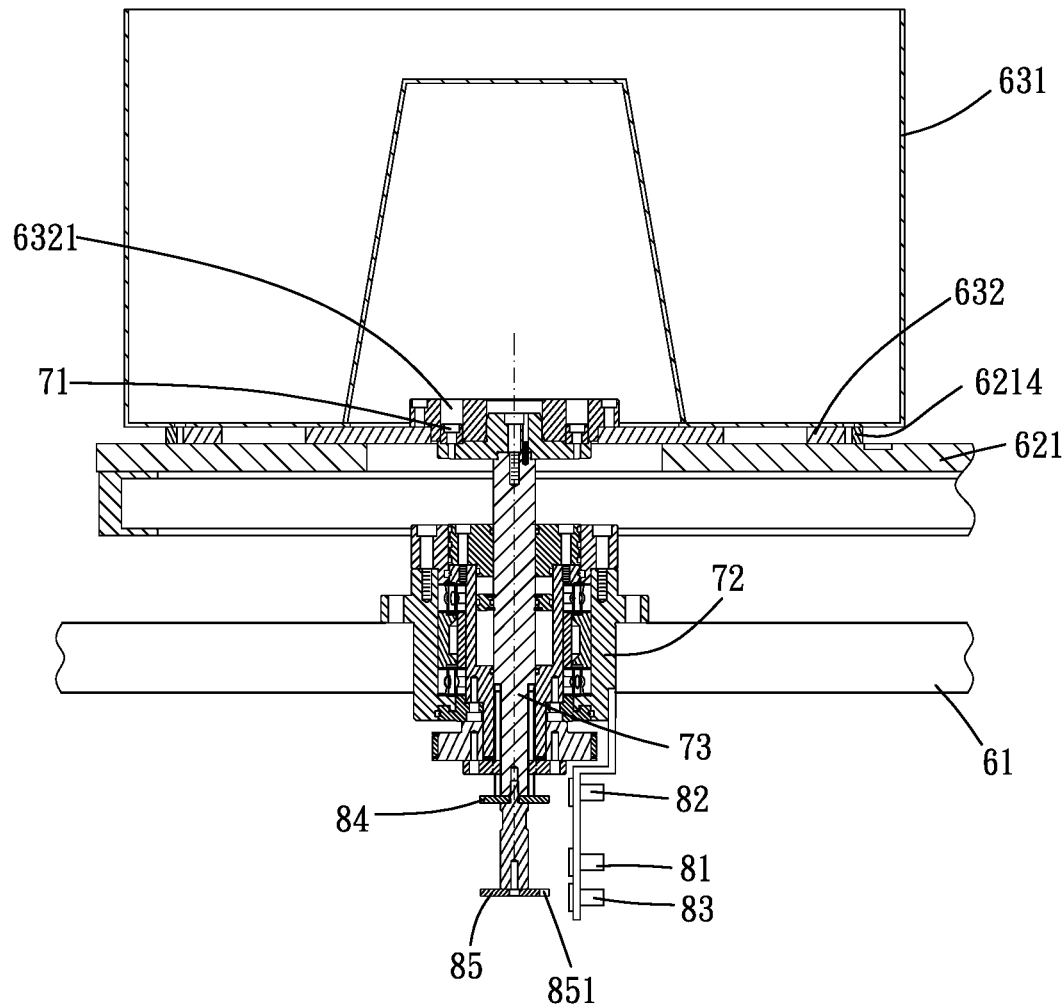
Figure 13:
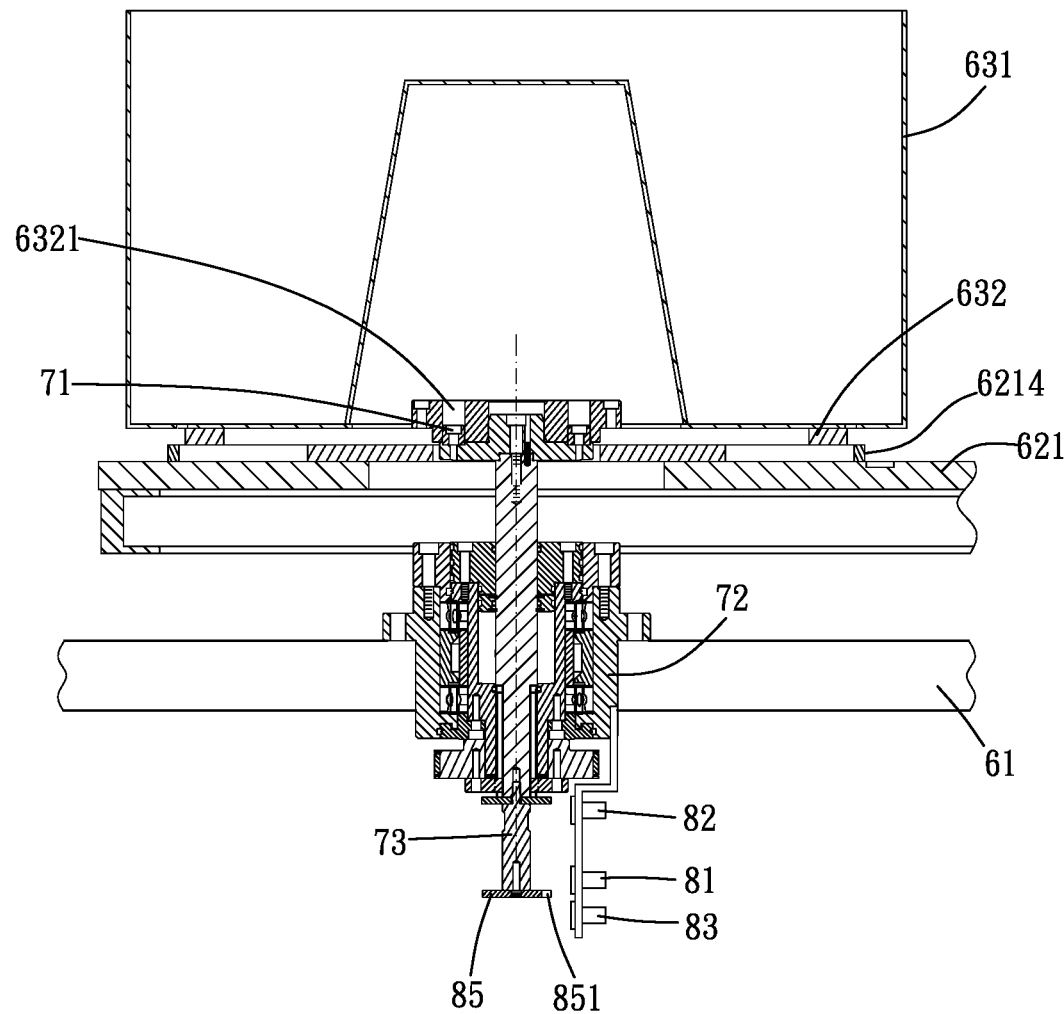
Figure 14:
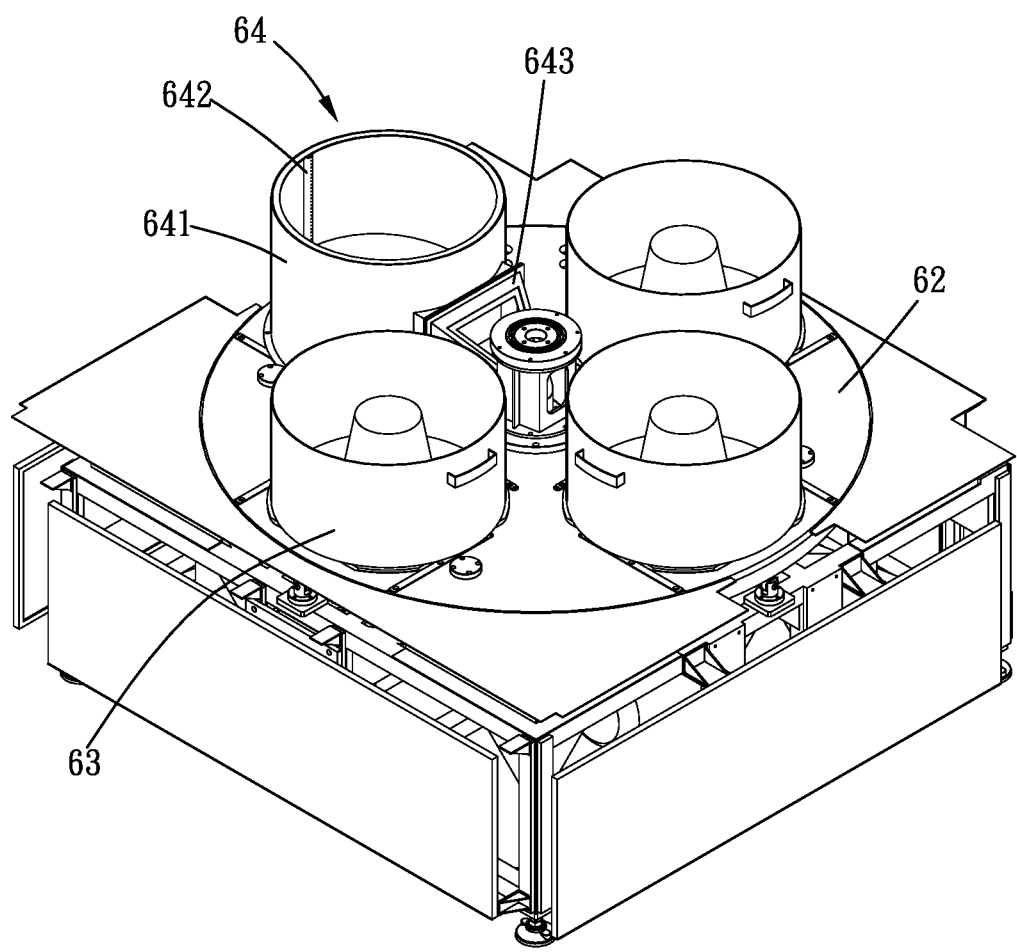
FIG. 14 is a stereogram showing a passivation bucket assembly of the present invention.
Figure 15:
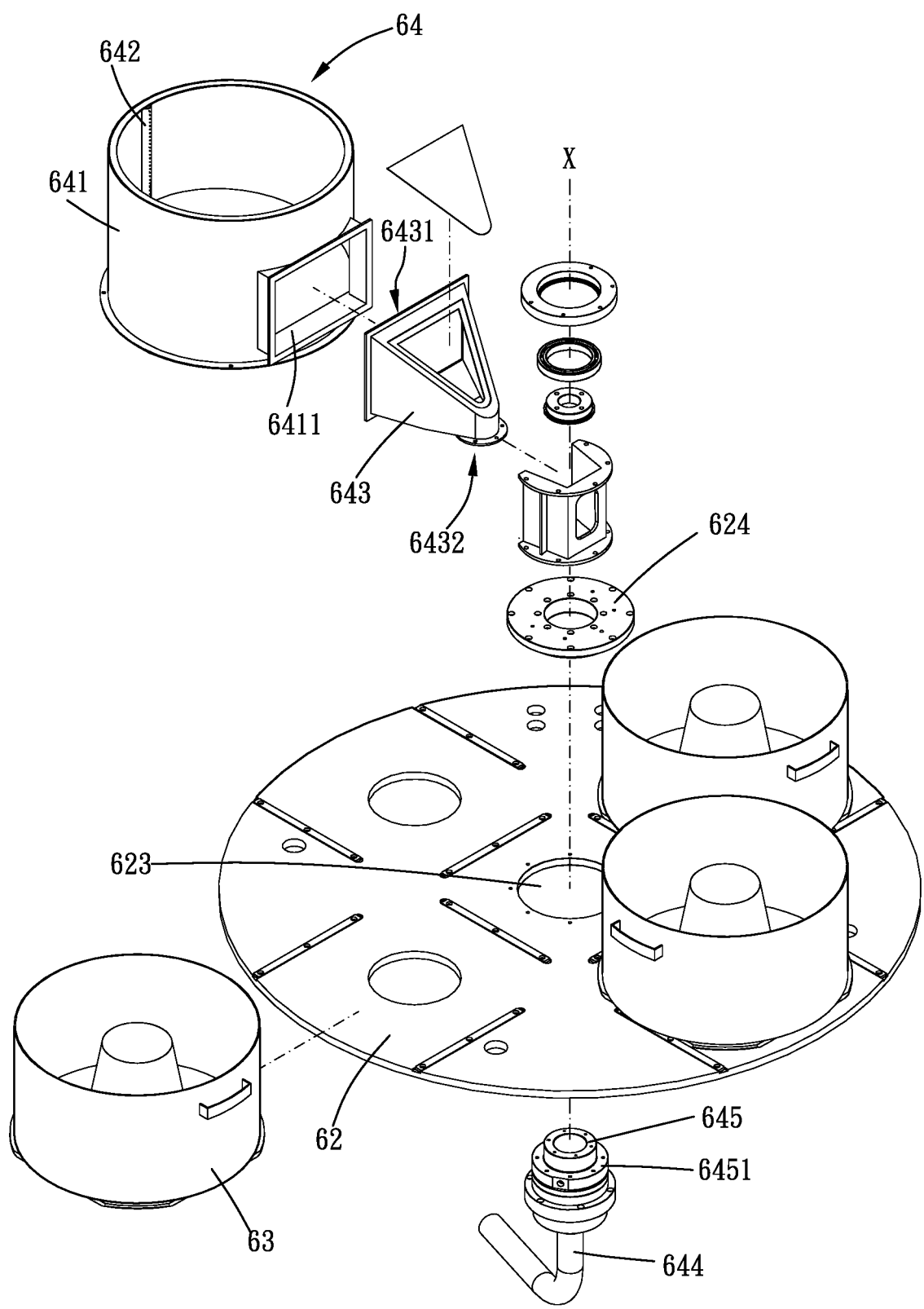
FIG. 15 is a breakdown drawing showing a passivation bucket assembly of the present invention.
Figure 16:
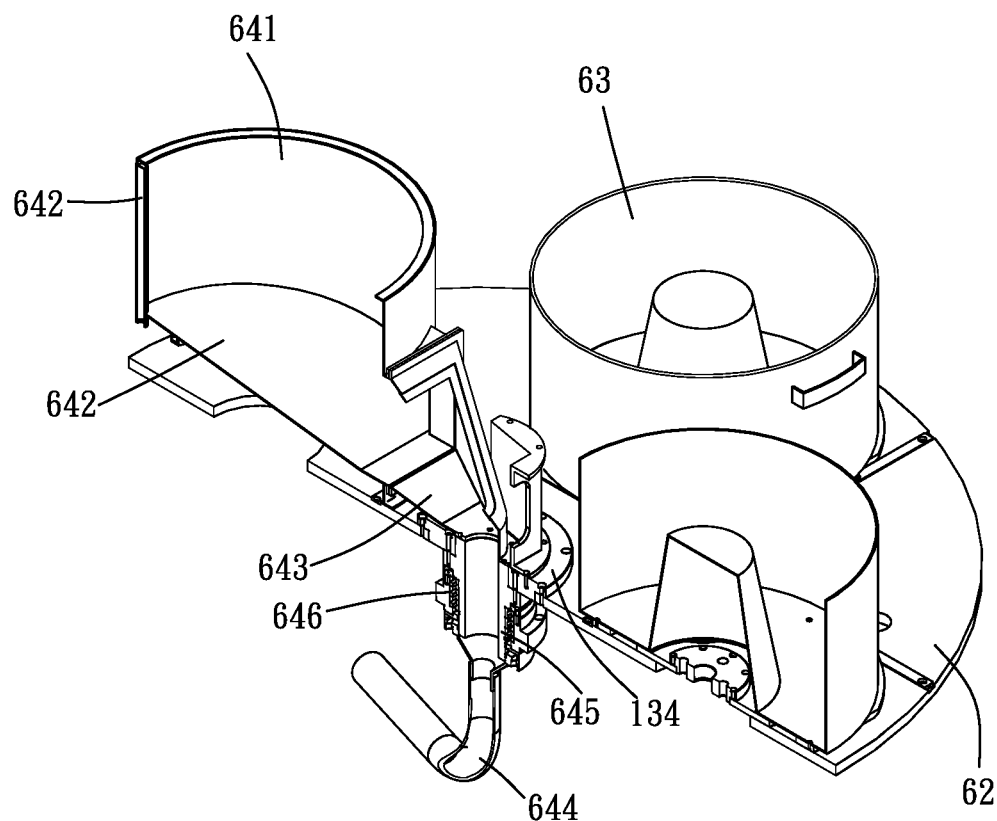
FIG. 16 is a cross-section view showing a passivation bucket assembly of the present invention.
Figure 17:
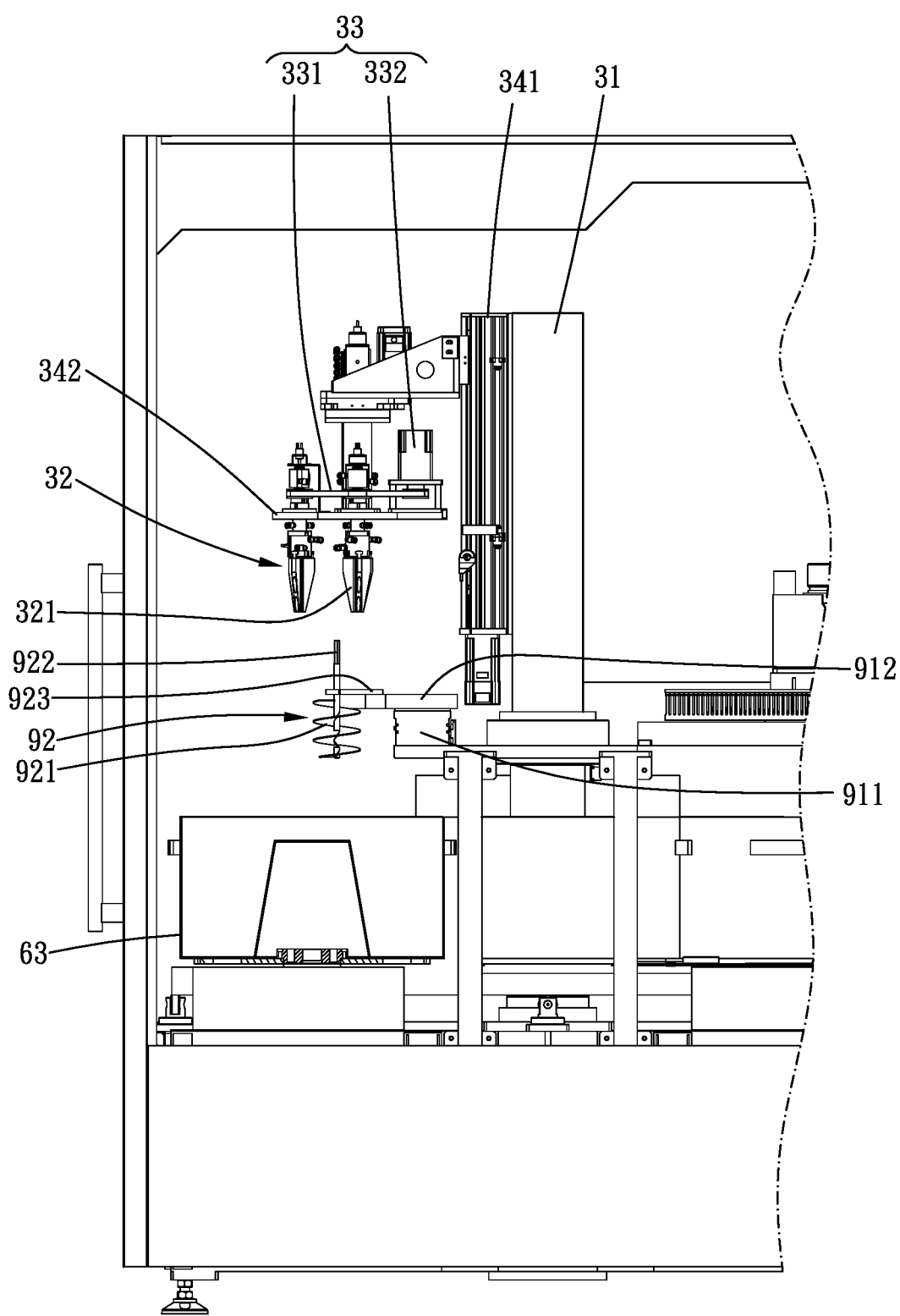
FIG. 17 and FIG. 18 are illustrations showing a particle-stirring device of the present invention.
Figure 18:
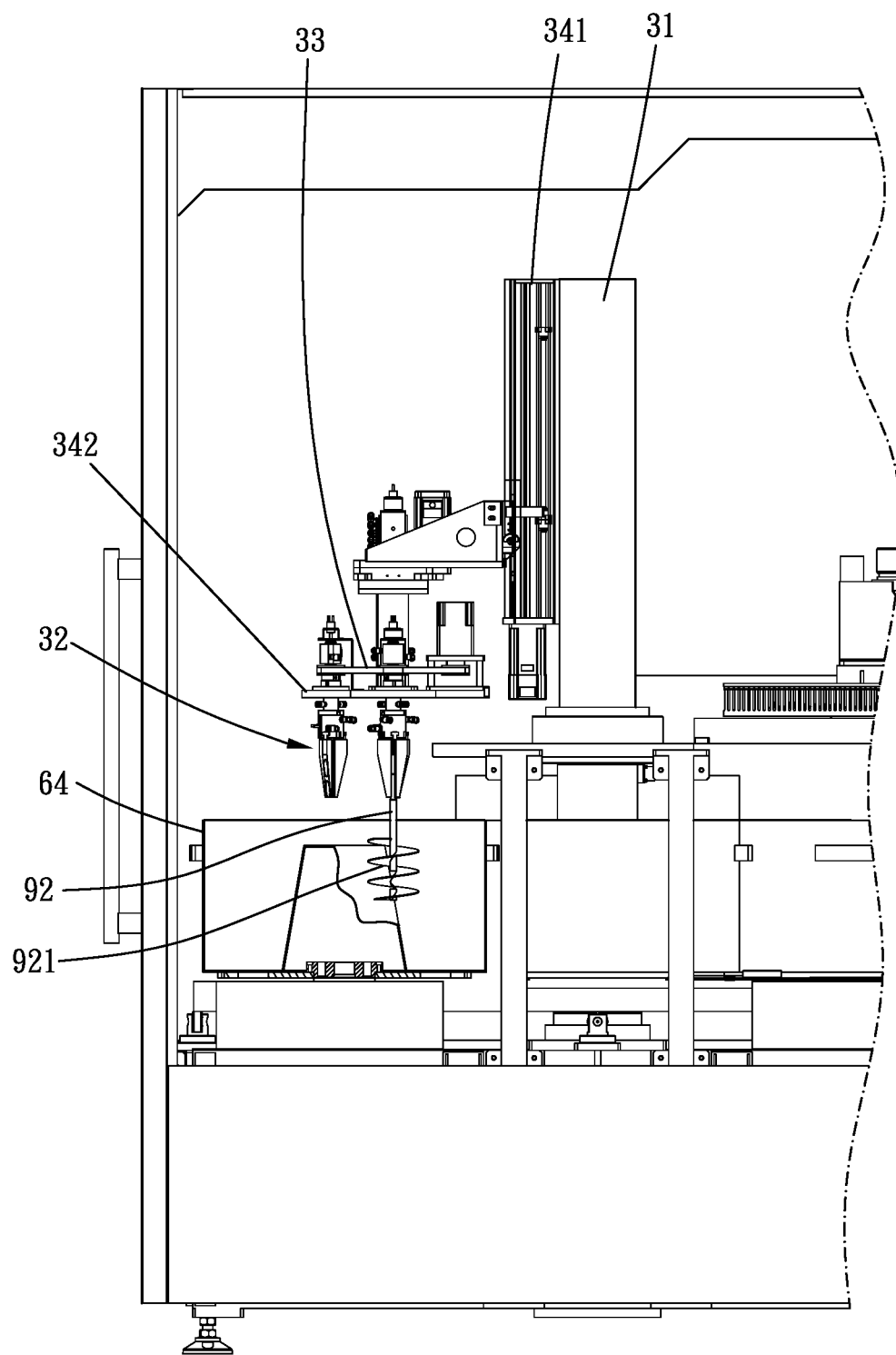
Figure 19:
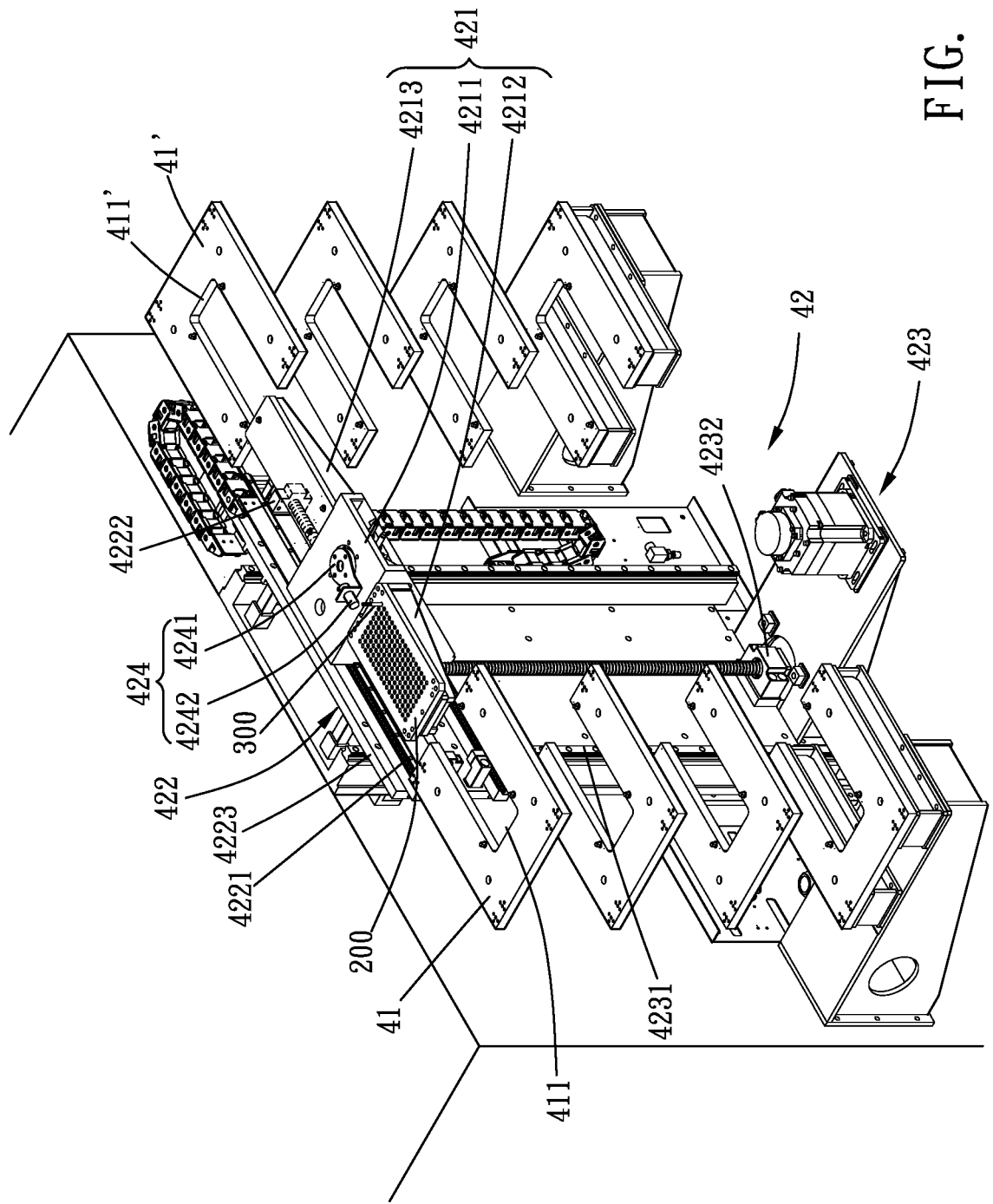
FIG. 19 is a stereogram showing a workpiece magazine of the present invention.
Figure 20:
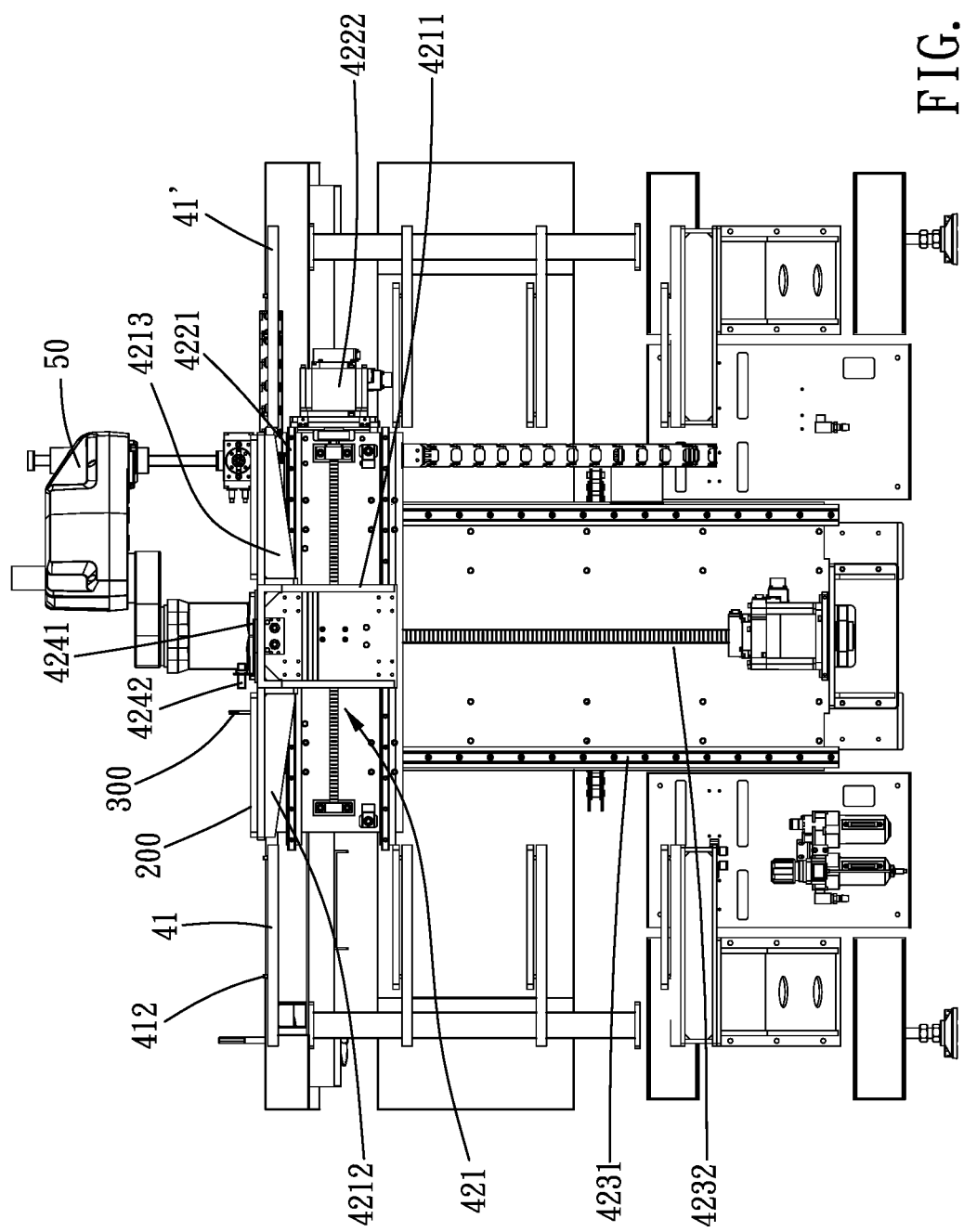
FIG. 20 is a lateral view showing a workpiece magazine of the present invention.
Figure 21:
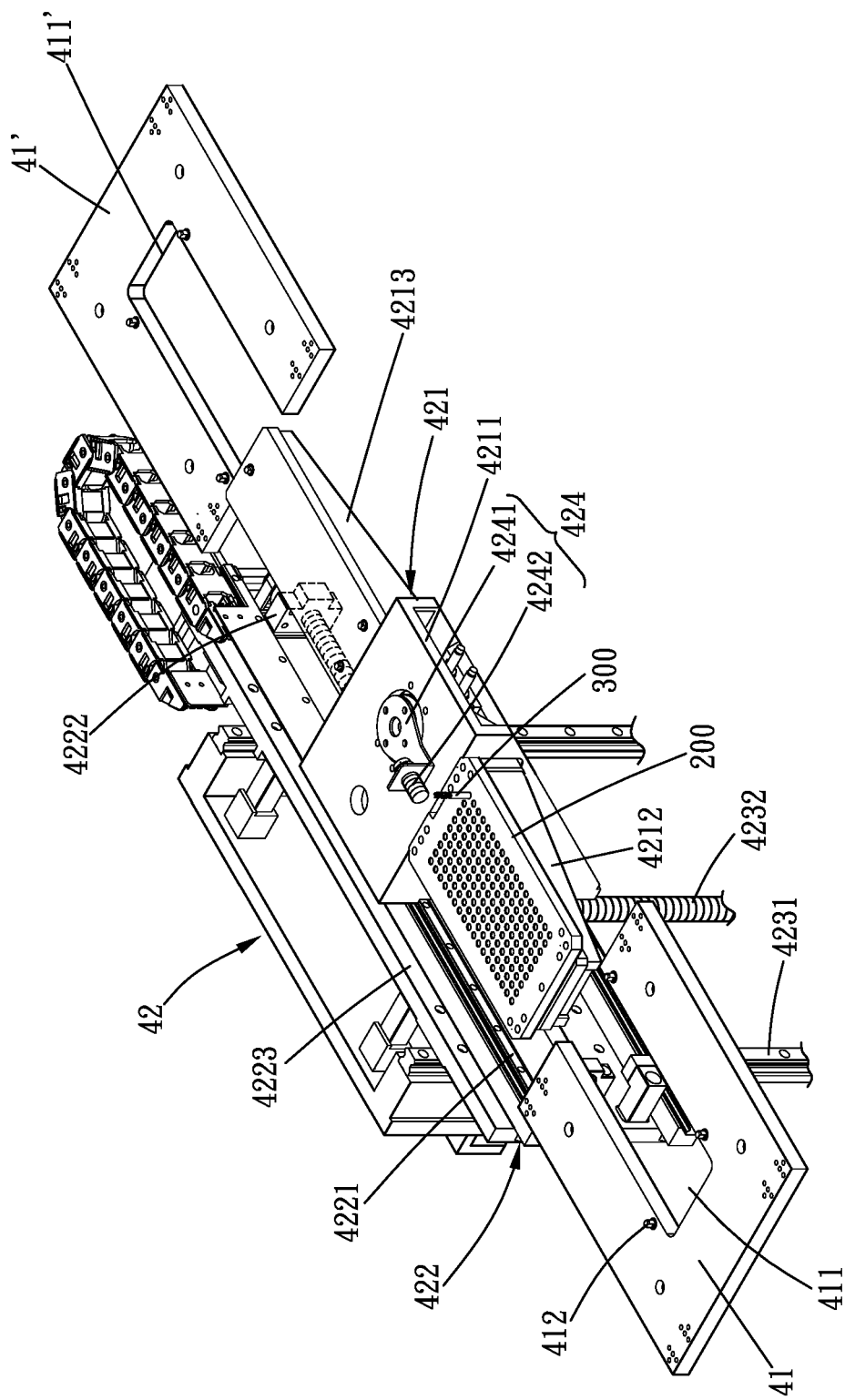
FIG. 21 is a partial stereogram showing a workpiece magazine of the present invention.

Please refer to FIG. 1 and FIG. 21, the automatic processing apparatus of the present invention includes a main body 10, a receiving portion 20, a working assembly 30, a workpiece magazine 40, a setting mechanism 50, a passivation bucket assembly 60, a rotation driving assembly 70, a detecting assembly, and a particle-stirring device 90.

The receiving portion 20 is disposed on the main body 10 and includes a plurality of receiving areas 21 spacedly arranged. Each of the receiving areas 21 is adapted for receiving a workpiece 300. The working assembly 30 is disposed on the main bod 10 and includes a turning mechanism 31 and a taking mechanism. The turning mechanism 31 drives the taking mechanism to pivot about a first turning axis between a taking position and a working position. The taking mechanism includes a plurality of taking members 32. The taking members 32 are spacedly arranged, and relative positions of the taking members 32 depend on relative positions of the receiving areas 21. Thus, the taking members 32 are just located above the receiving areas 21 and are able to grasp the workpieces 300 on the receiving areas 21 simultaneously to further carry them to the working position when the taking mechanism is pivoted to the taking position.

The workpiece magazine 40 includes a plurality of tables 41,41' and a driving apparatus 42. The tables are arranged at a side of the main body 10 and include a row of first tables 41 and a row of second tables 41'. The two rows of tables are spacedly aligned along a vertical direction respectively. Each of the tables 41,41' is adapted for receiving a tray 200. Each of the trays 200 is adapted for receiving a plurality of workpieces 300. The driving apparatus 42 includes a moving table 421, a horizontal driver 422, and a vertical driver 423. Preferably, the driving apparatus 42 further includes a detecting device 424. The moving table 421 receives trays 200 from the tables 41,41' and places the trays 200 onto the tables 41,41'. One of the horizontal driver 422 and the vertical driver 423 connects the moving table 421 and the other one of the horizontal driver 422 and the vertical driver 423 therebetween in order to drive the moving table 421 to move horizontally and vertically.

Specifically, the table 41 has a notch 411 vertically penetrating the table 41, and a side of the notch 411 horizontally extending to the table 41 is opened. The opened side of the notch 411 faces the driving apparatus 42 and is adapted for the tray 200 to place on. The driving apparatus 42 is located between the first table 41 and the second table 41'. The notch 411 of the first table 41 and the notch 411' of the second table 41' face each other. The moving table 421 has a shape corresponding to the tables 41,41' and is driven by the tables 41,41' to move so as to lift the tray 200 from one of the tables to make the tray 200 placed on the moving table 421. Or, the tray 200 on the moving table 421 is placed on the table 41,41'. More specifically, the moving table 421 includes a seat 4211, a first extension arm 4212, and a second extension arm 4213. The first extension arm 4212 is disposed on the seat 4211 and extends horizontally toward the first table 41. The second extension arm 4213 is disposed on the seat 4211 and extends horizontally toward the second table 41'. Width of each of the first extension arm 4212 and the second extension arm 4213 is slightly smaller than the width of each of the notches 411,411' so that the first extension arm 4212 and the second extension arm 4213 can penetrate the notches 411,411' vertically. The horizontal driver 422 is connected to the moving table 421 to drive the moving table 421 to move horizontally. More specifically, the horizontal driver 422 includes one or plural sliding tracks 4221 and horizontal driving members 4222. The seat 4211 of the moving table 421 is disposed on the sliding tracks 4221 to be horizontally movable. The horizontal driving member 4222 can be a screw motor to drive the seat 4211 of the moving table 421 to move.

The setting mechanism 50 is disposed on the main body 10 and includes a movable carrying mechanism. The carrying mechanism is adapted for carrying the workpieces 300 on the trays 200 on the moving table 421 to the receiving portion 20, and places the workpieces 300 on the receiving areas 21 respectively.

The passivation bucket assembly 60 includes a base 61, a turning table 62, and a plurality of passivation buckets 63. The turning table 62 is rotatably disposed on the base 61 to be rotatable about a turning axis. The passivation buckets 63 are spacedly arranged on the turning table 62 along a circumferential direction of the turning table 62. Each of the passivation buckets 63 has a first connecting structure on a bottom thereof. Preferably, the passivation bucket assembly further includes a cleaning bucket 64. The cleaning bucket 64 and the passivation buckets 63 are spacedly arranged on the turning table 62. The cleaning bucket 64 includes a bucket body 641, a gas-providing mechanism 642, and a collecting mechanism. The gas-providing mechanism 642 communicates the bucket body 641 to inject gas into the bucket body 641. The collecting mechanism communicates the bucket body 641 to allow the gas in the bucket body 641 and the particles removed from the workpiece 300 to leave the bucket body 61.

Specifically, the gas-providing mechanism 642 and the collecting mechanism of the cleaning bucket 64 are connected to two opposite sides of the bucket body 641 along the radial direction of the bucket body 641. Preferably, the gas-providing mechanism 642 is connected to an end of the bucket body 641 away from the turning axis. The collecting mechanism is connected to an end of the bucket body 641 closer to the turning axis. Thereby, the collecting mechanism can further extend to the turning axis to connect to other collection structures. Specifically, the collecting mechanism includes a collecting pipe 643, a driving source (not shown in the drawings), and a discharging pipe 644. The bucket body 641 is formed with a discharging exit 6411 on the wall thereof at the end closer to the turning axis. An end of the collecting pipe 643 communicates the discharging exit 6411 so that the collecting pipe 643 can move following the turning table 62. The discharging pipe 644 is connected to the other end of the collecting pipe 643 and is rotatable with respect to the collecting pipe 643 around the turning axis. The driving source is connected to at least one of the collecting pipe 643 and the discharging exit 644 so that the gas in the bucket body 641 is sucked into the collecting pipe 643 and the discharging pipe 644 and is discharged via an end of the discharging pipe 644 away from the collecting pipe 643. The end of the discharging pipe 644 away from the collecting pipe 643 can be further connected to a filter mechanism (not shown in the drawings) to collect the particles. When the turning table 62 rotates, the collecting pipe 643 pivots following the turning table 62. However, the discharging pipe 644 and the filter mechanism are fixed to become a fixed part of the passivation machine.

Preferably, the collecting pipe 643 has an inlet 6431 and an outlet 6432. The inlet 6431 extends along the radial direction of the turning table 62. The outlet 6432 extends downward along the turning axis. The vertical cross-section of the collecting pipe 643 is reduced from the inlet 6431 toward the outlet 6432 so that the collecting pipe 643 is substantially funnel-shaped. More specifically, the collecting mechanism further includes an extension pipe 645 and at least one bearing 646. The extension pipe 645 is arranged below the outlet 6432 of the collecting pipe 643. The extension pipe 645 is inserted into the discharging pipe 644. The bearing 646 is sandwiched between the extension pipe 645 and the collecting pipe 643. Thus, the extension pipe 645 is rotatable with respect to the collecting pipe 643. To facilitate assembling and dissembling, the turning table 62 can be formed with a through hole 623 on the center thereof along the axial direction. A ring-shaped seat 624 can be disposed beside the through hole 623. The upper end of the extension pipe 645 is inserted through the seat 624 and is fixed to the periphery of the outlet of the collecting pipe 643. The extension pipe 645 is further formed with a flange 6451 outward extending along the radial direction. The top face of the flange 6451 is fixed to the bottom face of the seat 624 so that the seat 624 is sandwiched between the collecting pipe 643 and the extension pipe 645.

The rotation driving assembly 70 is disposed on the base 61 at a side of the turning table 62 opposite to the passivation buckets 63. The rotation driving assembly 70 is rotatable about a rotation axis and is movable toward the turning table 62 or away from the turning table 62 between a driving position and an original position. The rotation driving assembly 70 has a second connecting structure corresponding to the first connecting structure to be able to engage with the first connecting structure selectively. Thus, the passivation bucket 63 can be non-rotatably connected to the rotation driving assembly 70.

The detecting assembly includes a first sensor 81, a second sensor 82, a third sensor 83, a height detect portion 84, and an angle detect portion 85. The first sensor 81, the second sensor 82, and the third sensor 83 are disposed on the base 61 respectively. The first sensor 81 is lower than the second sensor 82 in height. The height detect portion 84 and the angle detect portion 85 are disposed on the rotation driving assembly 70 respectively and are able to move following the rotation driving assembly 70. The height detect portion 84 corresponds to the first sensor 81 and the second sensor 82, and the angle detect portion 85 corresponds to the third sensor 83. The angle detect portion 85 is arranged at a side of the rotation driving assembly 70. For example, the angle detect portion 85 can be a notch 851, and the third sensor 83 is also located at a side of the rotation driving assembly 70. When the rotation driving assembly 70 is at the original position, the height detect portion 84 is at a height substantially the same with that of the first sensor 81 so that the height detect portion 84 is detected by the first sensor 81. When the rotation driving assembly 70 is at the driving position, the height detect portion 84 is at a height substantially the same with that of the second sensor 82 so that the height detect portion 84 is detected by the second sensor 82. When the rotation driving assembly 70 is at the driving position, the angle detect portion 85 is detected by the third sensor 83 if the rotation driving assembly 70 rotates to make the angle detect portion 85 enter the detect range of the third sensor 83.

The particle-stirring device 90 includes a stirring member supporting mechanism 91 and at least one stirring member 92. The stirring member supporting mechanism 91 includes a second pivot axle 911 and at least one supporting mechanism 912. The supporting mechanism 912 is connected to the second pivot axle 911 to be pivotable about the second pivot axle 911 between a standby position and a stirring position. The stirring member 92 is supported by the supporting mechanism 912. The stirring member 92 has a spiral knife portion 921 spirally extending about a vertical direction. When the taking mechanism is at a knife-taking position and the supporting mechanism 912 is at the stirring position, one of the taking member 32 can pick up the stirring member 92 from the supporting mechanism 912. The knife-taking position is located between the taking position and the working position.

When the rotation driving assembly 70 is at the driving position, the first connecting structure and the second connecting structure are engaged together so that the rotation driving assembly 70 drives the passivation bucket 63 to rotate about the rotation axis when rotating. When the rotation driving assembly 70 is at the original position, first connecting structure and the second connecting structure are separated so that the passivation bucket 63 cannot be driven to rotate by the rotation driving assembly 70.

In the present embodiment, the turning table 62 includes a base plate 621 and a driving mechanism 622. The base plate 621 is formed with a plurality of opening holes 6211 arranged around the turning axis. The passivation buckets 63 are arranged on the opening holes 6211 respectively to cover the opening holes 6211. The driving mechanism 622 is connected to the base plate 621 to drive the base plate 621 to rotate around the turning axis. The driving mechanism 622 includes a rotation motor 6221 and a transmission member 6222 which is connected to the rotation motor 6221 and is driven to rotate by the rotation motor 6221. A passive chain 6212 is arranged around the periphery of the bottom of the base plate 621. The transmission member 6222 is engaged with the passive chain 6212 so that the base plate 621 is driven to rotate via the passive chain 6212 when the transmission member 6222 is driven to rotate by the rotation motor 6221. Preferably, at least one positioning member 100 is movably disposed on the base 61. The turning table 62 is formed with at least one positioning hole 6213. The positioning member 100 is selectively lifted to insert into the positioning hole 6213 to prevent the turning table 62 from rotating.

In view of the first connecting structure and the second connecting structure, in the present embodiment, the first connecting structure includes at least one recess 6321, and the second connecting structure includes at least one insertion piece 71. Each of the recess 6321 and the insertion piece 71 is away from the rotation axis. When the rotation driving assembly 70 is at the driving position, the insertion piece 71 is inserted into the recess 6321 so that the rotation driving assembly 70 is able to drive the passivation bucket 63 to rotate about the rotation axis.

To ensure that the passivation bucket starts rotating only when the passivation bucket is lifted above the turning table, the turning table 62 has a plurality of first restriction structures at eccentric positions thereof, and each of the passivation buckets 63 has a second restriction structure at an eccentric position of the bottom thereof. The second restriction structure and the first restriction structure can be engaged when they are aligned so that the first restriction structure and the second restriction structure interfere each other along a direction parallel to the turning table 62. When the rotation driving assembly 70 is at the driving position, the passivation bucket 63 is lifted by the rotation driving assembly 70 so that the first restriction structure and the second restriction structure are staggered from each other along the direction parallel to the turning table 62. In addition, the rotation driving assembly 70 can drive the passivation bucket 63 to rotate about the rotation axis. When the rotation driving assembly 70 is at the original position, the first restriction structure and the second restriction structure interfere each other along the direction parallel to the turning table 62.

In the present embodiment, each of the passivation buckets 63 includes a bucket body 631 and a plate 632. The plate 632 is disposed on the bottom of the bucket body 631. The plate 632 has two lateral fringes 6322 parallel arranged. The two lateral fringes 6322 are the second restriction structure. Each of the first restriction structure includes two protruding ribs 6214 parallel arranged. A positioning space is defined between the two protruding ribs 6214. The distance between the two protruding ribs 6214 corresponds to the distance between the two lateral fringes 6322 so that the plate 632 can be positioned in the positioning space without rotation. Preferably, each of the first restriction structures can further includes a front protruding rib 6215 located between the two protruding ribs 6214 to correspond to a front fringe 6323 of the plate 632.

Besides, each of the receiving areas 21 includes a clamp. The clamp is composed of a plurality of movable clamping members 211. A clamping space is enclosed by the clamping members 211 and is opened upward. The clamping space is adapted for receiving a workpiece 300 so that the workpiece 300 is clamped by the clamp. Each of the receiving areas 21 further includes a driving portion 212. The driving portion 212 is connected to the clamp to drive the clamping members 211 to move. The receiving portion 20 further includes a main driving portion 23. The driving portions 212 are connected to the main driving portion 23 respectively. The main driving portion 23 provides power to the driving portions 212. Preferably, each of the receiving areas 21 further includes a sensor 213. The distance between the clamping members is defined as the width of the clamping space. The sensor 213 is adapted for detecting the positions of the clamping members 211 in order to acquire the width of the clamping space.

To make the receiving portion have more receiving areas and to prevent the receiving areas from blocking the setting mechanism, the receiving areas have to be movable so as to move the empty receiving areas to the positions that the setting mechanism can reach. In the present embodiment, the receiving portion 20 at least includes a first receiving zone and a second receiving zone. The first receiving zone and the second receiving zone are located at different sides of the receiving portion. Each of the first receiving zone and the second receiving zone includes at least one said receiving area 21. A side of the receiving portion 20 is defined as a receiving side. The receiving portion 20 is rotatable so that the first receiving zone and the second receiving zone are movable. Thereby, one of the first receiving zone and the second receiving zone can be moved to the receiving side.

Therefore, the workpieces to be processed can be carried and placed on the receiving portion by the workpiece magazine, and the taking member of the working assembly can carry plural workpieces at the same time to the working position for processing. Besides, the passivation bucket assembly has plural passivation buckets, so the passivation bucket can be changed by rotating the turning table if needed. On the other hand, the single rotation driving assembly can fit different passivation buckets, and the rotation driving assembly may not rotate with the turning table so that the burden of the turning table can be reduced. Besides, the cleaning bucket can be used to clean the processed workpiece to remove the particles adhered on the workpiece. Thus, different particles may not be mixed. In addition, to prevent the particles in the passivation bucket from agglomerating, the taking member is further used to pick up the stirring member to stir the particles in a manner of spiral rotation.

In conclusion, the present invention can provide an automatic process from the workpiece magazine, workpiece-receiving, workpiece-taking, passivation bucket changing, workpiece cleaning, particle-stirring, and returning to the workpiece magazine. In addition, plural workpieces can be processed at the same time, and the performance of processing is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automatic processing apparatus comprising:
a main body,
a receiving portion, the receiving portion arranged on the main body and having a plurality of receiving areas, the receiving areas being spacedly arranged, each of the receiving areas being adapted for receiving one of a plurality of workpieces;
a working assembly, the working assembly arranged on the main body and comprising:
a taking mechanism configured to be rotatably driven to pivot around a first rotation axis between a taking position and a working position, the taking mechanism having a plurality of members that move the workpieces to the working position when the taking mechanism is pivoted to the taking position, the members being spacedly arranged and relatively positioned above the receiving areas;
a workpiece magazine comprising:
a plurality of tables, at least two of the tables being spacedly aligned along a vertical direction, each of the tables being adapted for receiving one of a plurality of trays, each tray being adapted to support at least one of the workpieces; and
a driving apparatus having a horizontal driver, a vertical driver, and a moving table, the moving table being adapted for receiving each tray on one of the tables and transporting each tray back to the table, one of the horizontal driver and the vertical driver connecting to the moving table and the other one of the horizontal driver and the vertical driver therebetween so that the moving table is driven to move horizontally and vertically;
a receiving mechanism disposed on the main body and having a movable carrier adapted for carrying the workpieces on the tray on the moving table to the receiving portion and placing the workpieces on the receiving areas respectively;
a passivation bucket assembly having a base, a turning table disposed on the base and rotatable around a turning axis, and a plurality of passivation buckets being spacedly arranged around the turning table and disposed on the turning table, each of the passivation buckets having a first connecting structure on a bottom thereof, and
a rotation driving assembly being disposed on the base of the passivation bucket assembly and being located at a side of the turning table opposite to the passivation buckets, the rotation driving assembly being rotatable around a second rotation axis, the rotation driving assembly being movable toward the turning table or away from the turning table between a driving position and an original position, the rotation driving assembly having a second connecting structure, the second connecting structure having a corresponding structure with respect to the first connecting structures to be able to connect to the first connecting structures in order to make the passivation buckets and the rotation driving assembly connected non-rotatably with respect to each other;
wherein when the rotation driving assembly is at the driving position, one of the first connecting structures and the second connecting structure are connected together so that the respective passivation bucket is driven to rotate around the second rotation axis when the rotation driving assembly rotates; and
wherein when the rotation driving assembly is at the original position, the first connecting structure and the second structure are separated so that the passivation bucket is not driven to rotate by the rotation driving assembly.

2. The automatic processing apparatus of claim 1, wherein the turning table of the passivation bucket assembly has a base plate and a driving mechanism connected to the base plate, the base plate having a plurality of opening holes arranged around the turning axis, the passivation buckets being located above the opening holes to cover the opening holes, and the driving mechanism drives the base plate to rotate around the turning axis;
wherein the driving mechanism of the passivation bucket assembly has a rotation motor and a transmission member connected to the rotation motor and driven to rotate by the rotation motor; and
wherein a passive chain is disposed on the base plate to surround a bottom of the base plate, the transmission member being engaged with the passive chain so that the base plate is driven to rotate around the turning axis via the passive chain when the transmission member is driven to rotate by the rotation motor.

3. The automatic processing apparatus of claim 1, wherein the first connecting structure of each of the passivation buckets includes at least one recess, the second connecting structure of the rotation driving assembly includes at least one insertion piece which is protruded,
wherein when the rotation driving assembly is at the driving position, the at least one insertion piece is inserted into the at least one recess so that the rotation driving assembly drives the passivation bucket to rotate about the second rotation axis.

4. The automatic processing apparatus of claim 1, further comprising:
at least one positioning piece, the at least one positioning piece being liftably disposed on the base of the passivation bucket assembly, the turning table being formed with at least one positioning hole, the at least one positioning piece being liftable to insert into the at least one positioning hole to prevent the turning table from rotating.

5. The automatic processing apparatus of claim 1, further comprising:
a plurality of first restriction structures, each first restriction structure arranged at an eccentric position on a top surface of the turning table;
a plurality of second restriction structures, each second restriction structure corresponding to one of the passivation buckets, each second restriction structure arranged respectively at an eccentric position on a bottom of one of the passivation buckets, each one of the second restriction structures adapted for engaging with one of the first restriction structures to interfere with each other horizontally;
wherein when the rotation driving assembly is at the driving position, one of the passivation buckets is lifted by the rotation driving assembly so that the first restriction structures and the second restriction structures are out of interference from each other along a horizontal direction, thereby the rotation driving assembly is able to drive one of the passivation buckets to rotate about the second rotation axis;

when the rotation driving assembly is at the original position, the first restriction structures and the second restriction structures interfere with each other along the horizontal direction.

6. The automatic processing apparatus of claim 5, wherein each of the passivation buckets includes a bucket body and a plate, the plate is arranged on a bottom of the bucket body, the plate has two parallel lateral sides, the two lateral sides are the second restriction structure, each of the first restriction structures includes two protruding ribs parallel and spacedly arranged, a positioning space is defined between the two protruding ribs, the two protruding ribs have a distance therebetween depending on a distance between the two lateral sides of the plate so that the plate is able to be positioned in the positioning space by the two protruding ribs.

7. The automatic processing apparatus of claim 1, further comprising:
   a detecting assembly comprising:
      a first sensor, a second sensor, and a third sensor, wherein the first sensor, the second sensor, and the third sensor are disposed on the base, and the first sensor is lower than the second sensor in height;
      a height detect portion, the height detect portion selectively corresponding to the first sensor and the second sensor and
      an angle detect portion, the angle detect portion corresponding to the third sensor,
      wherein the height detect portion and the angle detect portion are disposed on the rotation driving assembly respectively to move following the rotation driving assembly, the angle detect portion and the third sensor being disposed on a side of the at least one rotation driving assembly;
      wherein when the rotation driving assembly is at the original position, the height detect portion corresponds to the first sensor in height so that the height detect portion is sensed by the first sensor;
      wherein when the rotation driving assembly is at the driving position, the height detect portion corresponds to the second sensor in height so that the height detect portion is sensed by the second sensor; and
      wherein when the rotation driving assembly is at the driving position, and the rotation driving assembly rotates so that the angle detect portion is moved into a sensing range of the third sensor, the angle detect portion is sensed by the third sensor.

8. The automatic processing apparatus of claim 1, wherein each of the receiving areas has a clamp composed of a plurality of movable clamping claws, the movable clamping claws enclose a clamping space which is open upward, the clamping space is adapted for receiving a workpiece so that the workpiece is clamped by the movable clamping claws;
   wherein each of the receiving areas has a driving portion connected to the clamp to drive the movable clamping claws,
   wherein the receiving portion further includes a main driving portion, the driving portions are connected to the main driving portion respectively, the main driving portion supplies power to the driving portions.

9. The automatic processing apparatus of claim 8, wherein each of the receiving areas has a sensor, a width of the clamping space is defined as a distance between the movable clamping claws, the sensor is adapted for detecting positions of the movable clamping claws so as to acquire the width of the clamping space.

10. The automatic processing apparatus of claim 1, wherein the receiving portion has a first receiving zone and a second receiving zone, the first receiving zone and the second receiving zone are located at different sides of the receiving portion, each of the first receiving zone and the second receiving zone has at least one said receiving area, a side of the receiving portion is defined as a receiving side, the receiving portion is rotatable so as to move the first receiving zone and the second receiving zone to make one of the first receiving zone and the second receiving zone move to the receiving side.

11. The automatic processing apparatus of claim 1, wherein the passivation bucket assembly has a cleaning bucket, the cleaning bucket and the passivation buckets are spacedly arranged on the turning table, the cleaning bucket includes a bucket body, a gas provider, and a collecting device, wherein the gas provider is connected to the bucket body to jet gas into the bucket body and the collecting device communicates with the bucket body to discharge gas and particles removed from the workpiece in the bucket body.

12. The automatic processing apparatus of claim 1, further comprising:
   a particle-stirring device, the particle-stirring device having a stirring member supporting mechanism and at least one stirring member, the stirring member supporting mechanism having a pivot axle and at least one supporting mechanism, the at least one supporting mechanism being connected to the pivot axle and being pivotable about the pivot axle between a standby position and a stirring position, the at least one stirring member being supported by the at least one supporting mechanism, the stirring member having a spiral knife portion, the spiral knife portion extending about the vertical direction;
   wherein when the taking mechanism is at a knife-taking position located between the taking position and the working position and the at least one supporting mechanism is at the stirring position, one of the members of the taking mechanism is able to take the at least one stirring member from the supporting mechanism.

* * * * *